US010375149B2

(12) United States Patent
Hawkins

(10) Patent No.: US 10,375,149 B2
(45) Date of Patent: Aug. 6, 2019

(54) APPLICATION REGISTRATION AND INTERACTION

(71) Applicant: BlackBerry Limited, Waterloo (CA)

(72) Inventor: Siavash James Joorachian Hawkins, London (GB)

(73) Assignee: BlackBerry Limited, Waterloo, Ontario (CA)

( * ) Notice: Subject to any disclaimer, the term of this patent is extended or adjusted under 35 U.S.C. 154(b) by 284 days.

(21) Appl. No.: 14/852,171

(22) Filed: Sep. 11, 2015

(65) Prior Publication Data

US 2015/0381714 A1 Dec. 31, 2015

Related U.S. Application Data

(63) Continuation of application No. PCT/US2014/026728, filed on Mar. 13, 2014.

(60) Provisional application No. 61/782,511, filed on Mar. 14, 2013.

(51) Int. Cl.

| | |
|---|---|
| ***G06F 9/48*** | (2006.01) |
| ***G06F 3/0482*** | (2013.01) |
| ***H04L 12/24*** | (2006.01) |
| ***H04L 29/08*** | (2006.01) |
| *H04W 88/02* | (2009.01) |

(52) U.S. Cl.

CPC ............ *H04L 67/10* (2013.01); *G06F 3/0482* (2013.01); *G06F 9/4843* (2013.01); *H04L 41/22* (2013.01); *H04W 88/02* (2013.01)

(58) Field of Classification Search

CPC ..................... G06F 9/445; G06F 3/048; G06F 9/4843–9/4887; G06F 21/57–21/577

See application file for complete search history.

(56) References Cited

U.S. PATENT DOCUMENTS

| | | | | |
|---|---|---|---|---|
| 8,612,470 | B1 * | 12/2013 | Fushman | G06F 16/178 707/767 |
| 2003/0093496 | A1 * | 5/2003 | O'Connor | H04L 29/06 709/217 |
| 2007/0050325 | A1 * | 3/2007 | Nakatomi | G06F 3/04817 |

(Continued)

OTHER PUBLICATIONS

International Search Report and Written Opinion received in PCT/US2014/026728, dated Aug. 8, 2014.

Dorflinger et al.; "Enhancing an Open Service Oriented Architecture with Collaborative Functions for Rural Areas"; 2008 IEEE International Technolgy Management Conference (ICE); Jun. 23, 2003; 10 pages.

(Continued)

*Primary Examiner* — Jennifer N To
*Assistant Examiner* — Liang Y Li
(74) *Attorney, Agent, or Firm* — Fish & Richardson P.C.

(57) ABSTRACT

Measures are described which provide a framework for the registration and selection of applications and/or services. A registration procedure comprises receiving an indication of one or more services that an application is configured to perform; receiving an indication of one or more characteristics of data objects in respect of which the indicated service is configured to be performed; and storing, in the data store, data entries indicating each of the services and associated characteristics. A selection procedure comprises determining one or more data objects for selection; identifying, one or more services that may be performed in relation to at least one of the one or more data objects; and displaying one or more selectable elements corresponding to the identified services and data objects.

28 Claims, 16 Drawing Sheets

(56) References Cited

U.S. PATENT DOCUMENTS

| | | | | |
|---|---|---|---|---|
| 2007/0100971 | A1 | 5/2007 | Hackmann | |
| 2008/0005689 | A1 | 1/2008 | Evernden et al. | |
| 2009/0241170 | A1* | 9/2009 | Kumar | H04L 47/10 726/3 |
| 2010/0130183 | A1* | 5/2010 | Kretz | H04M 1/72525 455/414.3 |
| 2010/0161714 | A1 | 6/2010 | Dongre | |
| 2011/0167173 | A1* | 7/2011 | Bansal | H03M 7/30 709/247 |
| 2011/0251992 | A1 | 10/2011 | Bethlehem et al. | |
| 2011/0276622 | A1 | 11/2011 | Knapp et al. | |
| 2012/0017178 | A1* | 1/2012 | Mulloy | G06F 9/4443 715/835 |
| 2012/0246216 | A1 | 9/2012 | Hinni et al. | |
| 2014/0063541 | A1* | 3/2014 | Yamazaki | G06F 3/1204 358/1.15 |
| 2014/0244580 | A1* | 8/2014 | Eisner | G06F 16/1824 707/623 |

OTHER PUBLICATIONS

Pakkala et al.; "A Component Model for Adaptive Middleware Services and Applications"; 33rd Euromicro Conference on Software Engineering and Advance Applications; IEEE; Aug. 1, 2007; 8 pages.

Extended European Search Report issued in European Application No. 14785180.2 dated Aug. 25, 2016.

Office Action issued in Chinese Application No. 20180028026.5 dated Feb. 1, 2018, 31 pages.

Communication Pursuant to Article 94(3) EPC in European Application No. 14785180.2 dated Jun. 21, 2018, 4 pages.

Communication under Rule 71(3) EPC in European Application No. 14785180.2 dated Dec. 3, 2018, 12 pages.

Office Action issued in Chinese Application No. 201480028036.5 dated Oct. 15, 2018, 14 pages.

Rejection Decision issued in Chinese Application No. 201480028026.5 dated May 7, 2019, 6 pages.

* cited by examiner

200

| Application (202) | Service (204) | Data Object Characteristics (206) | Processing Actions (208) | Outcome (210) |
|---|---|---|---|---|
| A1 *202a* | S1 *204a* | DOC1 *206a* | PA1 *208a* | OC1 *210a* |
| A1 *202b* | S2 *204b* | DOC2 *206b* | PA2 *208b* | OC2 *210b* |
| A2 *202c* | S3 *204c* | DOC3 *206c* | PA3 *208c* | OC3 *210c* |
| ... | ... | ... | ... | ... |

Figure 2

APPLICATION REGISTRATION AND INTERACTION

CROSS-REFERENCE TO RELATED APPLICATIONS

This application is a continuation under 35 U.S.C. § 120 of Patent Cooperation Treaty Application No. PCT/US2014/026728, filed Mar. 13, 2014, which claims the benefit of U.S. Provisional Application No. 61/782,511, filed Mar. 14, 2013. Each of the above-referenced patent application is incorporated by reference in its entirety.

BACKGROUND OF THE INVENTION

The present invention relates to the registration of applications on user terminals, in particular relating to the registration and selection of services for processing data objects, to provide a collaborative framework for interaction between applications.

Methods and apparatuses are known that provide functions for initiating processing or handling of data objects by executable programs or applications via a user terminal. Such data objects may include emails, documents, calendar entries, contacts entries or files. Typically an application may first be launched, and a particular data object for processing by that application is subsequently chosen from a list of compatible data objects displayed within the application. In an alternative known technique, a data object may first be chosen, after which a particular application may be selected from a list of compatible applications, in response to which the application is launched for processing the given data object.

Once an application has been launched for the processing of a particular data object, the application may offer one or more options for processing of that data object for selection by the user. For example a media application processing an audio file may offer options for playing the audio file, adding the audio file to a playlist, editing the audio file, setting the audio file as a notification alert (such as a "ringtone"). A number of further selections may also be required to define sub options for each of the previously presented options.

This series of interactions required to initiate the processing of a given data object by a given application according to one or more processing options may present an undesirably long or taxing experience for a user of that user terminal, particularly if the input/output options available of interaction with the device are limited. Hence, it is an object of the present disclosure to provide a collaborative framework for interaction between applications, and to facilitate the selection of options for processing of data objects on a user terminal.

SUMMARY

In accordance with a first aspect of the present invention there is provided a method of registering, in a data store, a plurality of services that may be provided on a user terminal, the method comprising: receiving, from each of a plurality of applications, an indication of one or more services that that the application is configured to perform; receiving, from each of the plurality of applications, an indication of one or more characteristics of data objects in respect of which each of the indicated service is configured to be performed; storing, in the data store, data entries indicating each of the services, and an association between the indicated services and the one or more characteristics of data objects in respect of which the one or more services may be performed.

In accordance with a second aspect of the present invention there is provided a computer program product comprising a non-transitory computer-readable storage medium having computer readable instructions stored thereon, the computer readable instructions being executable by a computerized device to cause the computerized device to perform a method according to the first aspect.

In accordance with a third aspect of the present invention there is provided a user terminal comprising a processor, the user terminal being configured to: receive, from each of a plurality of applications, an indication of one or more services that that the application is configured to perform; receive, from each of the plurality of applications, an indication of one or more characteristics of data objects in respect of which each of the indicated service is configured to be performed; store, in the data store, data entries indicating each of the services, and an association between the indicated services and the one or more characteristics of data objects in respect of which the one or more services may be performed.

In accordance with a fourth aspect of the present invention, there is provided a method of selecting a service for processing of a data object on a user terminal, the user terminal comprising a processor, the method comprising: maintaining in a data store: first data entries relating to one or more services that may be executed by one or more applications configured for use by the user terminal; and second data entries relating to one or more predetermined characteristics of data objects in respect of which corresponding ones of the one or more services may be performed; determining one or more data objects for selection by a user; identifying, based on the determined one or more data objects and on the data entries, one or more services that may be performed in relation to at least one of the one or more data objects; and displaying, on a display of the user terminal, one or more first selectable elements corresponding to at least one of the identified one or more services, and one or more second selectable elements corresponding to at least one of the determined one or more data objects, each of the first and second selectable elements being for selection by a user of the user terminal.

In accordance with a fifth aspect of the present invention there is provided a computer program product comprising a non-transitory computer-readable storage medium having computer readable instructions stored thereon, the computer readable instructions being executable by a computerized device to cause the computerized device to perform a method according to the fourth aspect.

In accordance with a sixth aspect of the present invention there is provided a user terminal comprising a processor, the user terminal being configured to: maintain, in a data store: first data entries relating to one or more services that may be executed by the one or more applications; and second data entries relating to one or more predetermined characteristics of data objects in respect of which corresponding ones of the one or more services may be performed; determine one or more data objects for selection by a user; identify, based on the determined one or more data objects and on the data entries, one or more services that may be performed in relation to at least one of the one or more data objects; and display, on a display of the user terminal, one or more first selectable elements corresponding to at least one of the identified one or more services, and one or more second selectable elements corresponding to at least one of the determined one or more data objects, each of the first and second selectable elements being for selection by a user of the user terminal.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2 illustrates a set of data entries maintained according to embodiments of the invention.

DETAILED DESCRIPTION OF CERTAIN INVENTIVE EMBODIMENTS

Figure 1A:
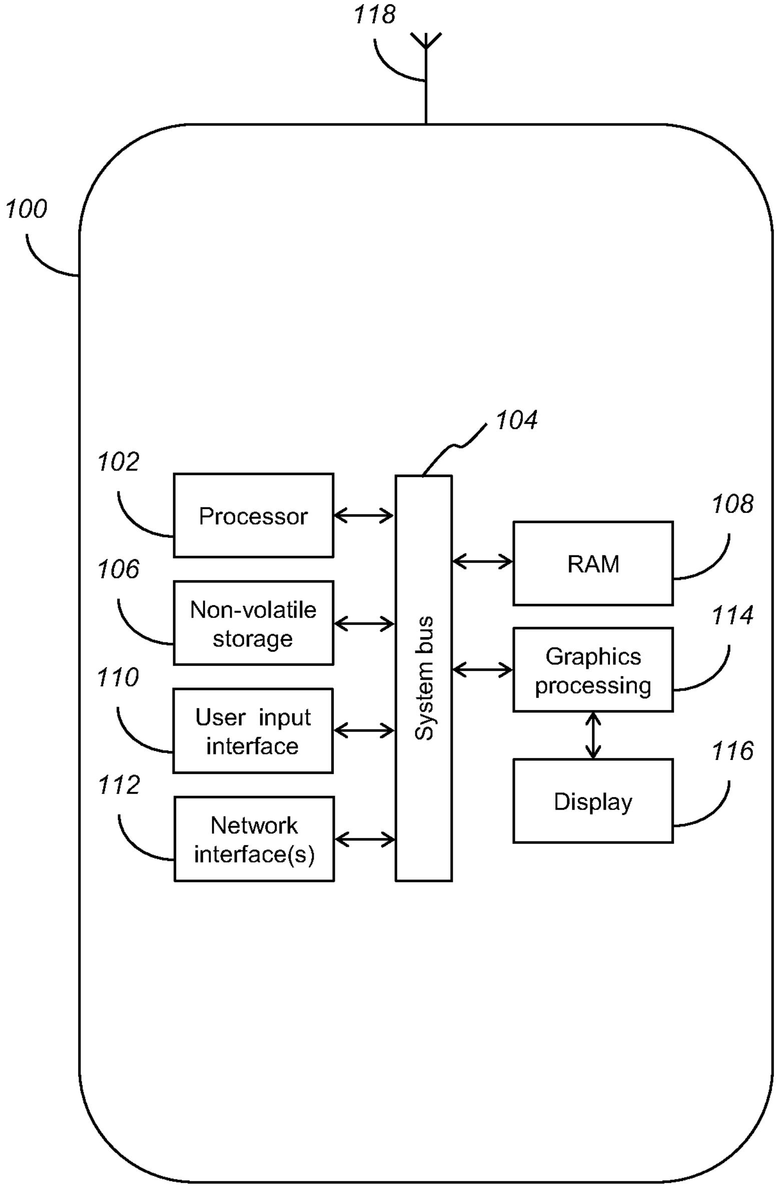
FIG. 1*a* schematically illustrates a user terminal for use with embodiments of the present invention.

FIG. 1*a* schematically illustrates a user terminal 100, which is an exemplary device used to illustrate the features of the present invention. User terminal 100 may take the form of a personal computer, a mobile or cell phone (including a so-called “smart phone”), a personal digital assistant (PDA), a pager, an e-reader, a laptop or tablet computer, content-consumption or generation devices (for music and/or video for example), etc., as well as fixed or more static devices, such as personal computers, game consoles and other generally static entertainment devices, various other domestic and non-domestic machines and devices, etc.

User terminal 100 includes a processor 102 that is able to transmit control messages to, receive status information from, and transmit data to and from components within user terminal 100 that are connected to a system bus 104, where these components may include a non-volatile storage device 106, random access memory 108, user input interface 110, network interface 112 and graphics processing component 114. The processor 102, which in this embodiment is a microprocessor, processes instructions stored in the random access memory (RAM) 108 that have been loaded from the non-volatile storage device 106 which could be for example a flash memory or a hard disk drive. These instructions are in the form of computer software in the form of one or more programs that implement an operating system and one or more installed applications. The RAM 108 is also used by programs running on the processor 102 as a means of storing and accessing data in the form of electronic signals where the data is used during the execution of the programs.

The operating system is computer software in the form of a program or set of programs whose instructions are loaded from non-volatile storage 106 by the processor 102 and executed when user terminal 100 is turned on. The operating system may start further programs automatically and/or may allow a user to start further programs, for example by the user using a user interface provided by the operating system. The operating system enables the sharing of the processing power provided by the processor 102 between the programs running on the processor 102.

The operating system provides a programmatic interface for programs running on the processor 102 allowing them to request functionality from the operating system. This programmatic interface may implement procedures, e.g. system calls, which a program running on the processor 102 may use in order to invoke the operating system and request it to provide desired functionality. In response to receiving a request for functionality the operating system may transmit control messages to, receive status information from, transmit data to and/or receive data from components (e.g. 106, 108, 110, 112, 114, 116) connected to the system bus 104 in order to provide the requested functionality, and may also return data to the requesting program as a result.

The operating system may provide a file system for storing, modifying and accessing files held in non-volatile storage 106. This file system may be accessible to other programs running on the processor 102 via the programmatic interface provided by the operating system. The operating system may also provide database access procedures for creating, accessing and modifying databases managed by the operating system (e.g. databases held in non-volatile storage 106). These database access procedures may also be accessible to other programs running on the processor 102 via the programmatic interface provided by the operating system.

The user terminal 100 includes a graphics processing component 114 that is able to render graphics in accordance with commands made by programs running on the processor 102 and output these to a display 116 which may reside within user terminal 100. In alternative embodiments, the display 116 may be an external component connected to user terminal 100 via an interface connection such as composite video, component video, Video Graphics Array, Digital Visual Interface, or High-Definition Multimedia Interface connection.

Programs running on the processor 102 can process user input obtained from a user input interface 110 that receives user input from a user input device or devices (not shown). The user input devices may include a touch-screen interface of the touch-screen display 116. Alternatively or in addition user input devices may include a keypad, keyboard, mouse and/or remote control which may be incorporated within user terminal 100 or may be connected to it via a wired or wireless connection.

User terminal 100 also includes a network interface 112 (or a plurality of such interfaces) that allows programs running on the processor 102 to transmit and receive data to and from other devices and systems external to user terminal 100.

Figure 1B:
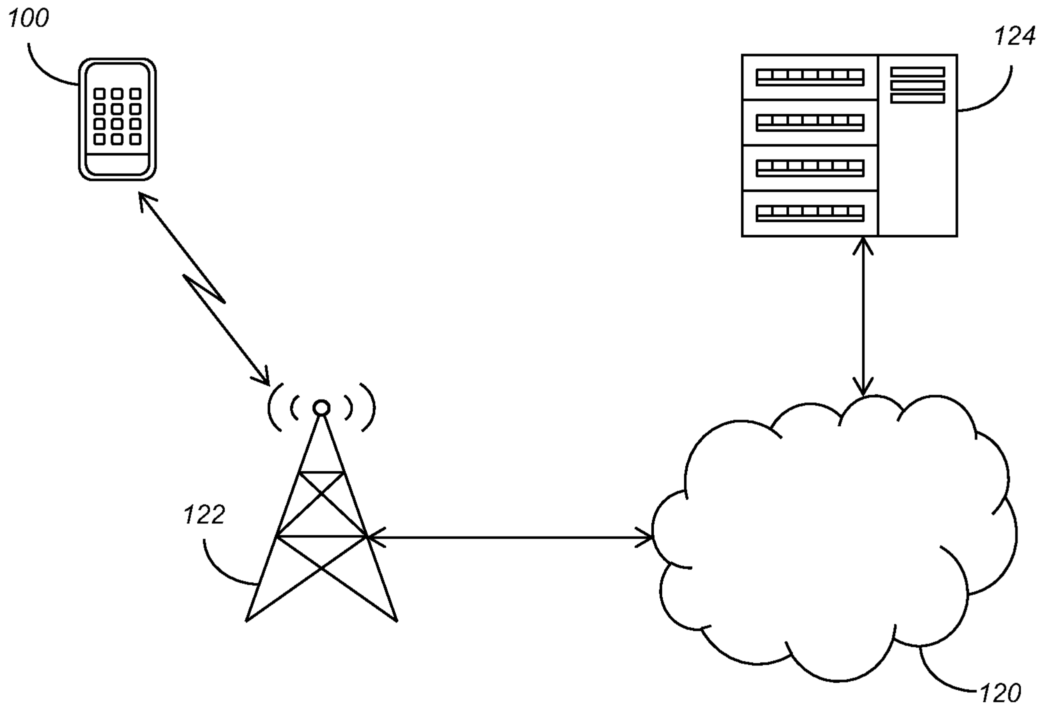
FIG. 1*b* schematically illustrates communication links that may be available to the user terminal.

FIG. 1*b* schematically illustrates communication links that may be available to user terminal 100 according to embodiments. In the embodiments depicted in FIG. 1*b*, user terminal 100 is able to transmit and receive data via a communications network 120 (or a plurality of such networks) such as the Internet and/or a private data communications network. The network interface 112 (or the plurality of such interfaces) may include a radio access network interface (or a plurality of such interfaces) that is able to communicate with a wireless access node 122 such as a base station or a wireless access point that provides access to communications network 120 (or a plurality of such networks). The network interface 112 (or plurality of such interfaces) may be able to connect to the wireless access node 122 via an antenna 118 (or a plurality of such antennas) using one or more radio access technologies including Global System for Mobile Communications (GSM), Universal Mobile Telecommunications System (UMTS), Long Term Evolution (LTE), fixed wireless access (such as IEEE 802.16 WiMAX), and wireless networking (such as IEEE 802.11 WiFi).

Additionally or alternatively, network interface 112 (or a plurality of such interfaces) may include a wired network interface (or a plurality of such interfaces) that is able to communicate with a wired access node (not shown) such as a network gateway or router that provides access to communications network 120 (or a plurality of such networks). The network interface 112 (or plurality of such interfaces) may be able to connect to the wired access node using one or more of a number of wireline access technologies such as IEEE 802.3 Ethernet.

The network interface 112 (or the plurality of such interfaces) may also include a modem and/or an Ethernet card or interface for use with a corresponding communications network (or networks) 120.

The operating system of user terminal 100 may provide messaging procedures for sending and receiving messages such as Short Messaging Services (SMS), Multimedia Messaging Services (MMS) and email via the communications network 120 by using the network interface 112. These messaging procedures may be accessible to other programs running on the processor 102 via the programmatic interface provided by the operating system.

The operating system may include a networking program that allows communication between programs running on the processor 112 and external devices via the network interface 112 and communications network 120 (or plurality of such networks) using networking protocols such as (for example) the Transmission Control Protocol (TCP) or the User Datagram Protocol (UDP). External devices which can be communicated with via communications network 120 may include one or more remote data processing device such as a server 124. The networking program and/or networking procedures may be accessible to other programs running on the processor 102 via the programmatic interface provided by the operating system on user terminal 100.

Server 124 may be a computer server (or a plurality of computer servers) with a network interface via which server 124 may be connected to communications network 120. The network interface of server 124 may also allow the server 124 to communicate with other remote data processing devices such as one or more further servers (not shown). In order to access content and services provided by remote data processing devices such as server 124, a user of the user terminal 100 may use a suitable application on user terminal 100.

Applications may be pre-loaded onto user terminal 100 before purchase of user terminal 100 by the user. Alternatively, an application may be downloaded and installed onto user terminal 100 by the user, for example by using an application store program to download and install the application via communications network 118.

The applications may be used to display user interfaces and provide programmatic functionality to allow a user to access services provided locally on user terminal 100 or remotely on a remote data processing device such as server 124. Each application may be configured to provide one or more services for processing data objects. As described in greater detail below, examples of data objects include an email, contact entry, calendar entry, task entry, message, document, media file, etc.

Registration

A framework is provided on user terminal 100 for registration and selection of services. The framework may be provided as a part of the operating system of user terminal 100, or in the form of an additional program or set of programs running on user terminal 100. The framework maintains, in a data store 200 a number of data entries relating to services available for the processing of data objects. The data store 200 may be included in the RAM 108 or non-volatile storage device 106 of the user terminal 100, for example. In other cases, the data store 200 may be stored remotely from the user terminal, for example at a server accessible by the user terminal 100. The data store 200 may take the form of a database, or similar data structure. FIG. 2 illustrates an exemplary set of data entries maintained on a data store 200 according to embodiments.

The data store may include application data entries 202 which indicate one or more applications that are configured for use by the user terminal. In some embodiments, each application data entry corresponds to one application available for use by said user terminal 100.

The data store may include service data entries 204 which indicate one or more services that are accessible via the one or more applications configured for use by user terminal 100. Each service data entry may be associated with one or more application data entries, the correspondence being determined on the basis of which application or applications provides access to the service indicated by a given service data entry. The services indicated by the second data entries may be provided by applications stored locally on the user terminal 100 or by applications stored remotely on a remote data processing device such as server 124.

The data store may include characteristic data entries 206 which indicate one or more predetermined characteristics (e.g. attributes) of data objects in respect of which one or more corresponding services may be performed. Each characteristic data entry may be associated with one or more service data entries, the correspondence being determined on the basis of which characteristics of data objects are compatible with the service indicated by a given service data entry. Each characteristic data entry may be alternatively or additionally associated with one or more application data entries, the correspondence being determined on the basis of which characteristics of data objects are compatible with the applications indicated by a given application data entry. In some embodiments, the association between application data entries and characteristic data entries may not be explicitly defined, but instead determined implicitly via a mutually associated service data entry.

The data store 200 may also include action data entries 208 which define processing actions which a given service may perform in respect of data objects having characteristics as defined by the characteristic data entries 206. For example, a processing action may be a printing operation which may be performed in respect of a data object having predefined characteristics (e.g. that the data object is of a certain type, such as a pdf file).

The data store 200 may also include outcome data entries 210, which define how the process is to proceed after performance of a processing action indicated by an action data entry. This which may include further steps to be performed after an associated processing action has been performed. For example, a given outcome data entry may indicate that the processing is to conclude with the completion of the associated processing action. For example, in the case of the processing action being a printing operation, the corresponding outcome may be that the processing ends after the data object is sent to a printer for printing. In other examples, an outcome data entry may indicate that processing is to continue, or to conclude in a different way; this is described in more detail below.

As described above, although not shown, the data store 200 may store associations between the different data entries. The combination of data entries and associations between them may therefore form a map defining interactions between data objects and services and/or applications. Further, as mentioned above, the outcome may indicate that processing is to continue.

In this case, a further set of data entries (not shown), forming a further map may be referenced. For example, for a particular combination of a data object selected by a user, the associated processing action may be to display selectable elements relating to further data objects and/or services with which the initially selected data object may interact. In this way, applications may register a hierarchy of data structures (maps) defining a multi-stage hierarchy of interactions between data objects and services that may be performed in relation to same. Examples of such multi-stage interaction are provided below. According to embodiments, only a subset of the illustrated data entry types may be maintained in the data store. For example, whilst the applications are typically identified as the providers of corresponding services, in order that requests for services may be routed to the corresponding application, in some embodiments, applications data entries 202 are not maintained. Instead applications may register the services that they are able to provide without explicitly registering any identifier of the application itself. In such cases, an application night only offer one service, or have a default service, such that registration of the service constitutes an implicit registration of the application, or vice versa.

An application may register the services that it is capable of providing and/or the objects that it is capable of handling with the framework. This may take place upon installation of the application on user terminal 100 or at a later time. Additionally, updates may be made when there is a change in the services that the application is capable of providing. Upon registration, the framework may generate the data entries to reflect the services that the registered application is capable of providing.

The registration of data entries as described above enables a collaborative user interface for presenting services of different applications in a single user interface (framework). Processing of data objects associated with one application (herein referred to as a "display application") by a different application (herein referred to as a "receiver application"). In embodiments, the framework can be invoked from a display application. In embodiments, some applications may constitute both a display application and a receiver application. Hence, in some such arrangements processing of a data object by an application may be initiated from the same application via the framework.

In order to facilitate this collaboration, in embodiments the data store 200 is a shared data area accessible by display applications, so that, subsequent to a receiver application registering data entries, a given display application is able to read the data entries registered by each receiver application. In embodiments, the data store 200 is also accessible by receiver applications.

A display application may read the data entries periodically. Receiver applications may provide indications when corresponding data entries are updated; in this case, only data entries that have been updated may be read by a display application.

In other embodiments, receiver applications may directly send updated data entries to display applications.

The framework and registration processes described above enable interaction between data objects and services associated with different applications through a general purpose user interface. This registration typically requires only a relatively small amount of data to be stored, and shared between different applications. Further, registration of, for example, services that data entries 204 and characteristic data entries 206 enable the identification of services to be performed in respect of given data objects without invoking a corresponding application.

Framework Processing

The framework may be invoked by a display application with respect to one or more data objects. For example, the framework may be invoked from a file browser application in respect of one or more files currently being viewed in the file browser. This display application may, for example, display a selectable element on the display 116 of user terminal 100, which when selected by the user prompts invocation of the framework. Alternatively, the framework may be invoked automatically (without user input) whenever a display application is executed, or whenever a display application displays data objects of a particular type, for example.

Upon invocation of the framework, one or more data objects are passed to the framework. The display application may alternatively pass identifiers for the one or more data objects to the framework upon invocation. In this manner, the framework is able to determine the one or more data objects. Prior to invocation of the framework, the display application may require selection by the user of the data objects to be passed to the framework. Alternatively, the display application may pass all data objects that are available for selection to the framework, or only a subset of the data objects, e.g. those that are currently visible on the display 116 of user terminal 100, those that are in the current directory or folder, those that match a filter criteria set by the user, or those returned by a search query.

Figure 3A:
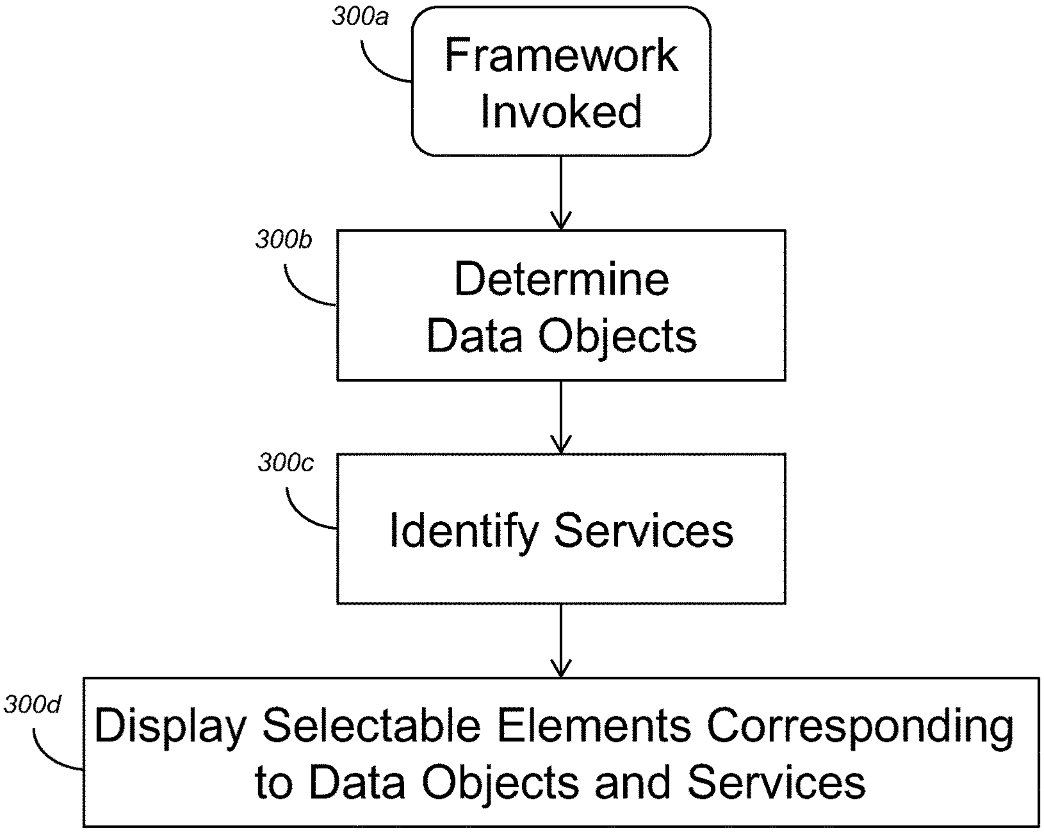
FIG. 3*a* illustrates an example of a process flow according to embodiments.

FIG. 3*a* illustrates a general example of a process flow according to embodiments. The framework is invoked at step 300*a*, and the one or more data objects are determined at step 300*b*, as described above. On the basis of the determined one or more data objects and on the data entries, one or more services that may be performed in relation to the determined one or more data objects are identified at step 300*c*. This may be achieved by comparing the characteristics of the determined data objects with the characteristics of data objects indicated by the characteristic data entries. Where the characteristics of a determined data object match those identified in a characteristic data entry 206*a*, 206*b*, 206*c*, etc., a service that may be performed in relation to that data object can be identified by a corresponding service data entry 204.

Having identified one or more services that may be performed in relation to at least one of the one or more data objects, the framework may display at step 300*d*, on a display 116 of user terminal 100, one or more first selectable elements corresponding to at least one of the identified one or more services, and one or more second selectable elements corresponding to at least one of the determined one or more data objects, each of the first and second selectable elements being for selection by a user of the user terminal.

Hence, an improved method is provided for the selection of data objects and services for processing data objects. As a result of the pre-registration of available services, the selection of the desired service can be made prior to the launch of the application that provides access to the service. Further, pre-registration of compatible data object characteristics enables the framework to offer services that are relevant to the determined data objects.

Figure 3B:
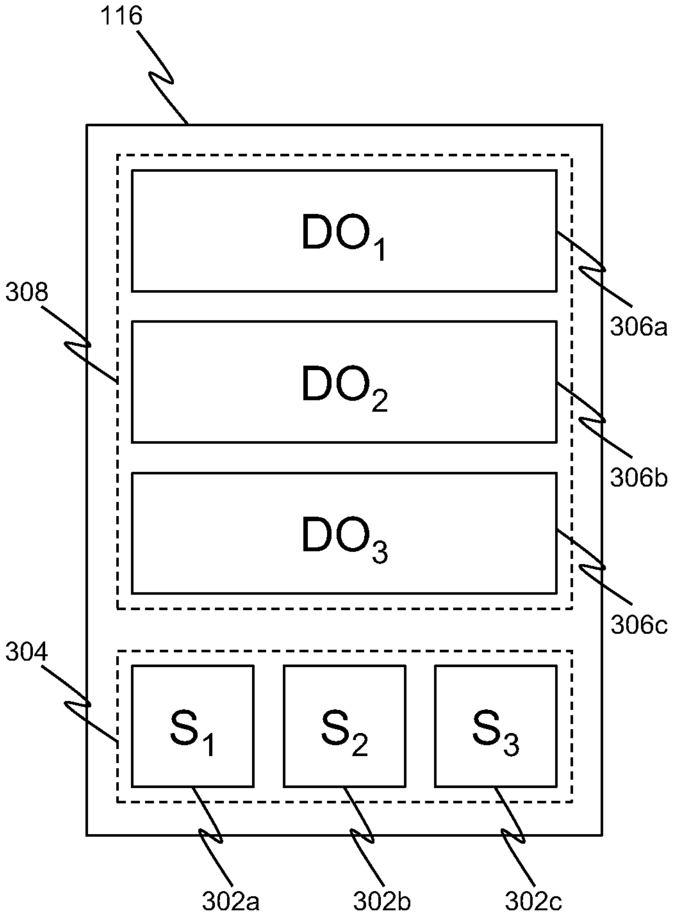
FIG. 3*b* illustrates an example of a display of a framework according to embodiments of the present invention.

FIG. 3*b* illustrates an exemplary display of the framework according to embodiments. A number of first selectable elements 302*a*, 302*b* and 302*c*, corresponding to identified services $S_1$, $S_2$ and $S_3$, are displayed on display 116 of user terminal 100. According to some embodiments, these first selectable elements are displayed in a first region 304 of display 116. A number of second selectable elements 306*a*, 306*b* and 306*c*, corresponding to determined data objects $DO_1$, $DO_2$ and $DO_3$, are also displayed on display 116 of user terminal 100. According to some embodiments, these second selectable elements are displayed in a second region 308 of display 116.

Figure 4:
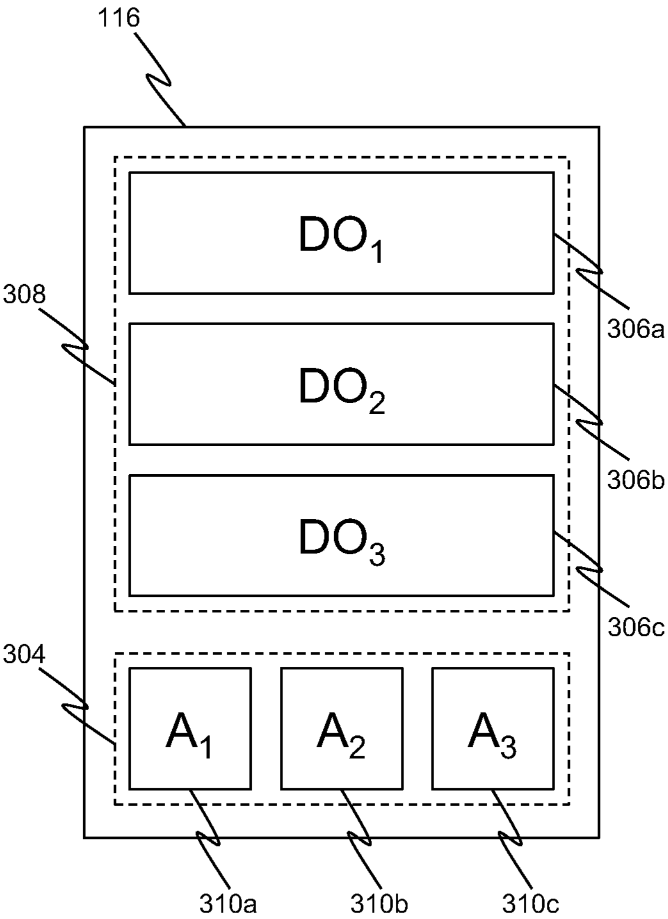
FIG. 4 illustrates a further example of a display of a framework according to embodiments.

It should be noted that while in the example of FIG. 3*b* selectable elements corresponding to identified services are displayed, in some embodiments, the selectable elements displayed correspond to applications configured to perform the identified services, as shown in FIG. 4, which illustrates an exemplary display of the framework according to embodiments. A number of third selectable elements 310*a*, 310*b* and 310*c*, corresponding to identified applications $A_1$, $A_2$ and $A_3$, are displayed on display 116 of user terminal 100. According to some embodiments, these third selectable elements are displayed in a first region 304 of display 116. A number of second selectable elements 306*a*, 306*b* and 306*c*, corresponding to determined data objects $DO_1$, $DO_2$ and $DO_3$, are also displayed on display 116 of user terminal 100. According to some embodiments, these second selectable elements are displayed in a second region 308 of display 116.

In some embodiments user selection of a third selectable element (i.e. corresponding to the identified applications) results in display of first selectable elements corresponding to identified services that the selected application is configure to perform.

Having displayed the one or more first selectable elements corresponding to at least one of the identified one or more services, and the one or more second selectable elements corresponding to at least one of the determined one or more data objects, the user may make a selection of a given data object and a given service by selecting the corresponding selectable elements. The selection may comprise the user providing appropriate user input to the user terminal 100. In response to receiving user input identifying selection of a given data object of the determined one or more data objects and receiving user input identifying selection of a given service of the identified one or more services, the framework identifies a given application that is configured to perform the given service. The given application may be capable of executing the given service locally on user terminal 100, or may alternatively provide access to a service executed by a remote processing entity, such as server 224.

The given application may be identified on the basis of the association between the service data entry corresponding to the given service and an application data entry corresponding to the given application. In embodiments wherein the third selectable elements (i.e. corresponding to the identified applications) are displayed for selection prior to the display of the first selectable elements (i.e. corresponding to the identified services), the given application may have already been selected by the user, in which case identification of the given application on the basis of an association between service data entry and the application data entry may not be necessary.

In embodiments wherein more than one application is capable of performing the given service, a default application may be identified as the given application. Alternatively, the user may have the option of predefining a preferred application, in which case the preferred application may be identified as the given application. Alternatively still, in cases where more than one application is capable of performing the given service, third selectable elements (i.e. corresponding to identified applications) may be displayed for selection by the user subsequent to the selection of the given service, and the given application may be identified in response to receiving user input identifying selection of an application. In some such embodiments, only third selectable elements corresponding to applications which are capable of performing the given service are displayed for selection by the user.

Having identified the application, the given service and the given data object, performance of the given service in relation to the given data object by the given application may be initiated. Initiation of performance of the given service may comprise launching the given application, passing the given data object to the given application and specifying the given service. Alternatively, an identifier for the given data object may be passed to the given application (such as its storage location in memory on user terminal 100) instead of the data object itself.

In cases where the service is provided by a remote data processing entity, such as server 124, the application may transmit a processing initiation message to the remote processing entity in order to initiate processing of the data object. The processing initiation message may comprises the given data object, to enable the remote processing entity to process the given data object. The processing initiation message may additionally or alternatively comprise one or more processing parameters, which may define how the data object and or service should be processed.

According to embodiments, the given application is only launched after completion of the selection of the given service and the given data object. Thus, the selection of service and data object can be completed without having to launch the given application. This removes the need to open a given application in order to determine whether it can provide access to the given service or process the given data object. Further, this removes the need to interrupt the user input identifying the given data object and service by waiting for the application to load before the user input can be completed.

In some embodiments, the user input may comprise a drag and drop operation performed on a touch sensitive display of user terminal 100. Embodiments enable selection of a data object and service in a single drag and drop gesture.

Figure 5:
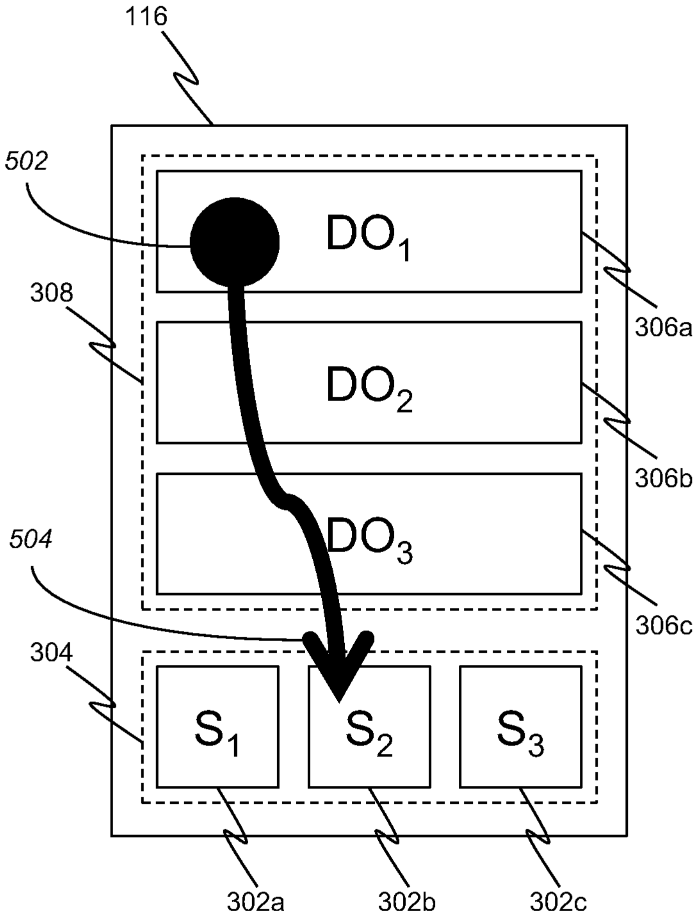
FIG. 5 illustrates an example of a selection of a given data object and a given service on the display of the user terminal.

FIG. 5 illustrates an example selection of a given data object and a given service on the display of user terminal 100. The user initiates the drag and drop operation by making contact with the selectable element corresponding to the given data object (in this case selectable element 306*a*, corresponding to data object $DO_1$), as shown by the circle 502, thereby identifying selection of the given data object. The user progresses the drag and drop operation by moving to the selectable element corresponding to the given service (in this case selectable element 302*b*, corresponding to service $S_2$), maintaining contact with the touch sensitive display throughout. The user completes the drag and drop operation by releasing contact with the touch sensitive display over selectable element 302*b*, thereby identifying selection of the given service. For example, the user may select a media file (a data object) at step 502, and drag onto the "play" service at step 504, which may initiate playback (service) of the given media file (data object) by the default media playing application.

Figure 6A:
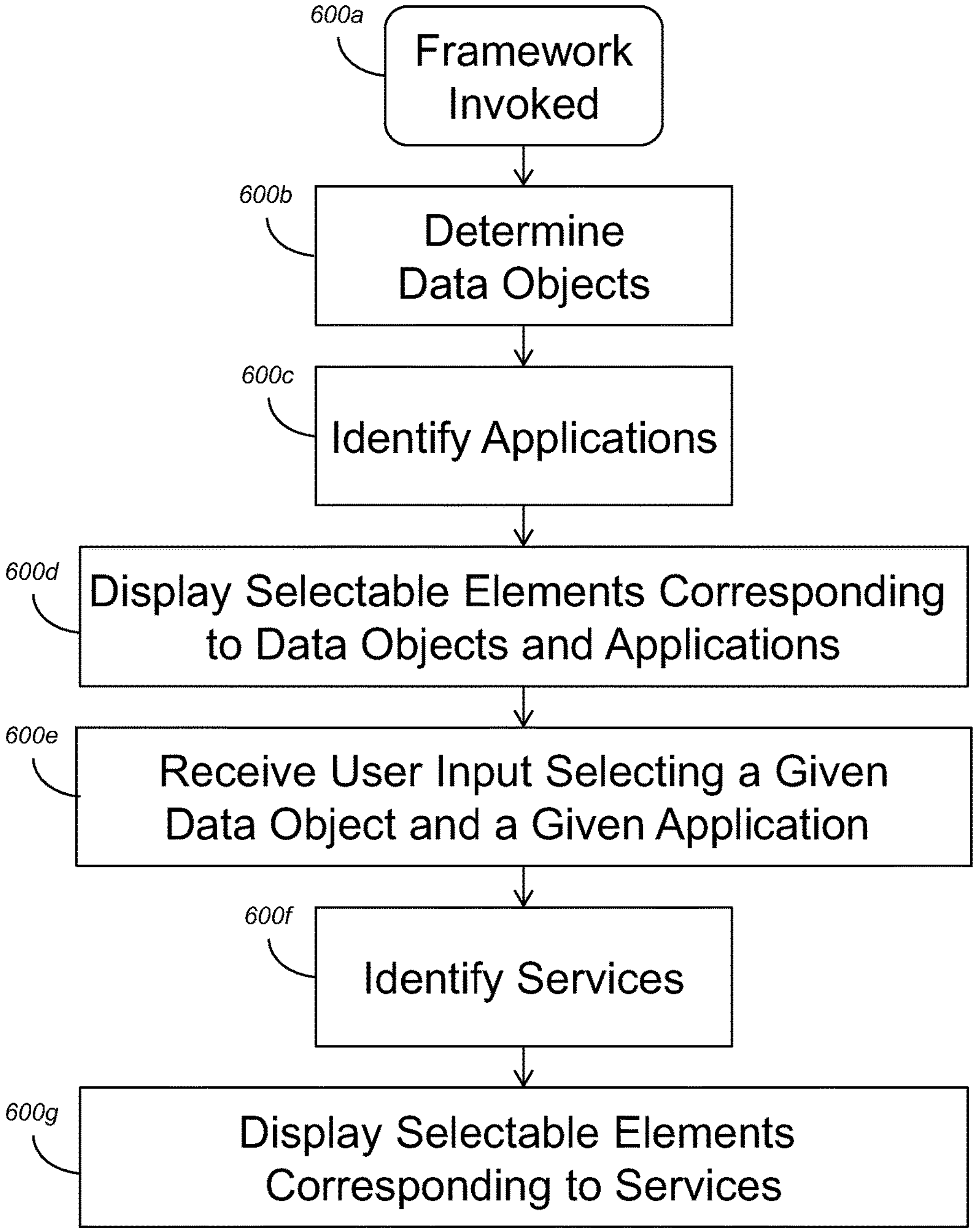
FIG. 6*a* illustrates an example of a process flow according to embodiments.

FIG. 6*a* illustrates an example process flow according to embodiments. The framework is invoked at step 600*a*, and the one or more data objects are determined at step 600*b*. On the basis of the determined one or more data objects and on the data entries, one or more applications that are configured to process at least one of the determined one or more data objects are identified at step 600*c*. This may be performed by comparing the characteristics of the determined data objects with the characteristics of data objects indicated by the characteristic data entries as described above. Having identified one or more applications that are configured to process at least one of the determined one or more data objects, the framework may display at step 600*d*, on a display 116 of user terminal 100, one or more third selectable elements corresponding to at least one of the identified one or more applications and one or more second selectable elements corresponding to at least one of the determined one or more data objects for selection by a user of the user terminal.

At step 600*e*, user input is received, identifying selection of a given data object and a given application. Having identified the given data object and the given application at step 600*e*, one or more services are identified in step 600*f*, on the basis of the data entries and the selected application and/or data object. Identification of the services may comprise comparing the characteristics of the given data object with the characteristics of data objects indicated by the characteristic data entries. Where the characteristics of a determined data object match those identified in a characteristic data entry 206 a service that may be performed in relation to that data object can be identified by a corresponding service data entry 204. According to embodiments, the identified services may be limited to those that can be provided by the selected application. This can be achieved by also referencing the corresponding application data entry 202 when identifying the services. Having identified one or more services at step 600*f*, the framework may display at step 600*g*, on a display 116 of user terminal 100, one or more first selectable elements corresponding to at least one of the identified one or more services for selection by a user of the user terminal.

Figure 6C:
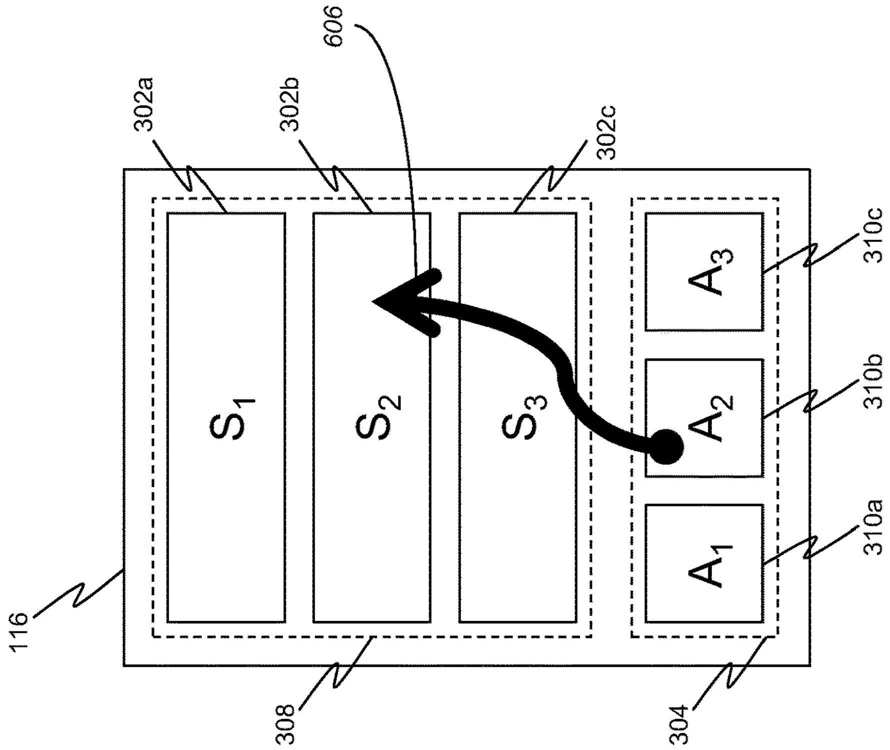
FIGS. 6*b* and 6*c* illustrate an example of a selection of a given data object, a given application and a given service on the display of the user terminal.
Figure 6B:
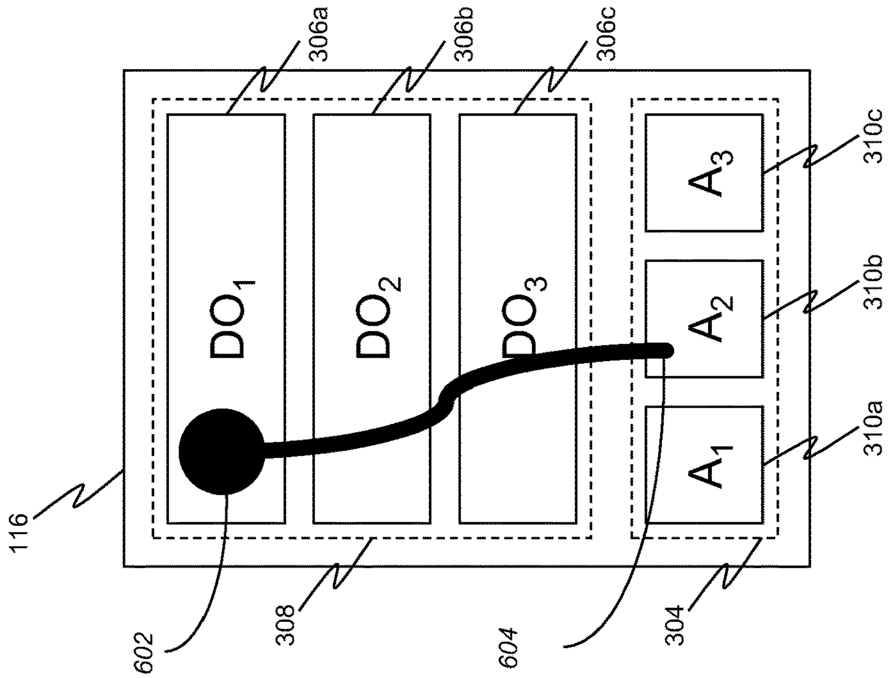

FIGS. 6*b* and 6*c* illustrate an example selection of a given data object, a given application and a given service on the display of user terminal 100, wherein the third selectable elements (i.e. corresponding to the identified applications) are displayed for selection prior to the display of the first selectable elements (i.e. corresponding to the identified services). In FIG. 6*b*, the user initiates the drag and drop operation by making contact with the selectable element corresponding to the given data object (in this case selectable element 306*a*, corresponding to data object $DO_1$), as shown by the circle 602, thereby identifying selection of the given data object. The user progresses the drag and drop operation by moving to the selectable element corresponding to the given application (in this case selectable element 310*b*, corresponding to application $A_2$), maintaining contact with the touch sensitive display throughout. The user pauses contact with the touch sensitive display over selectable element 310*b*, as shown at step 604, thereby identifying selection of the given application.

The drag and drop operation continues in FIG. 6*c*. Having identified selection of the given application, the first selectable elements 302*a*, 302*b* and 302*c* are displayed. In the embodiments shown in FIG. 6*b*, the first selectable elements are displayed in the second display region 308 in replacement of the previously displayed second selectable elements. In alternative embodiments the first selectable elements may be displayed in a third region of the display, outside of the first and second display regions (not shown). The user progresses the drag and drop operation by moving to the selectable element corresponding to the given service (in this case selectable element 302*b*, corresponding to service $S_2$), maintaining contact with the touch sensitive display throughout. The user completes the drag and drop operation by releasing contact with the touch sensitive display over selectable element 302*b*, as shown by step 606, thereby identifying selection of the given service.

As described above, the data store 200 may also include action data entries 208208 which indicate one or more processing actions for performance on selection of a service of the one or more services, and outcome date entries 210 indicating whether and subsequent processing is to be performed.

Each action data entry may be associated with one or more service data entries, the correspondence being determined on the basis of which processing actions are to be performed upon selection of the service indicated by a given service data entry. Similarly, each outcome data entry may be associated with one or more action data entries.

According to such embodiments, upon receiving user input identifying selection of the given data object and receiving user input identifying selection of the given service, the framework identifies, based on at least the action data entries and the user input identifying selection of the given service, one or more processing actions to be performed. The identified processing actions may then be performed in response to their identification. For example, the processing actions may comprise displaying on the display of the user terminal 100 one or more fourth selectable elements each corresponding to one or more processing options available for the processing of the given data object according to the given service and/or application. The processing options may include, for example, options for selection of a recipient to which the given data object may be sent. The selection of a selectable element corresponding to a processing option may comprise a continuation of a previously described drag and drop action. The selection of processing options may continue in an iterative manner through the selection of further processing options. To continue the example given above, the further processing options may include, for example, options for selection of a specific address associated with a previously selected recipient to which the given data object may be sent.

Figure 7A:
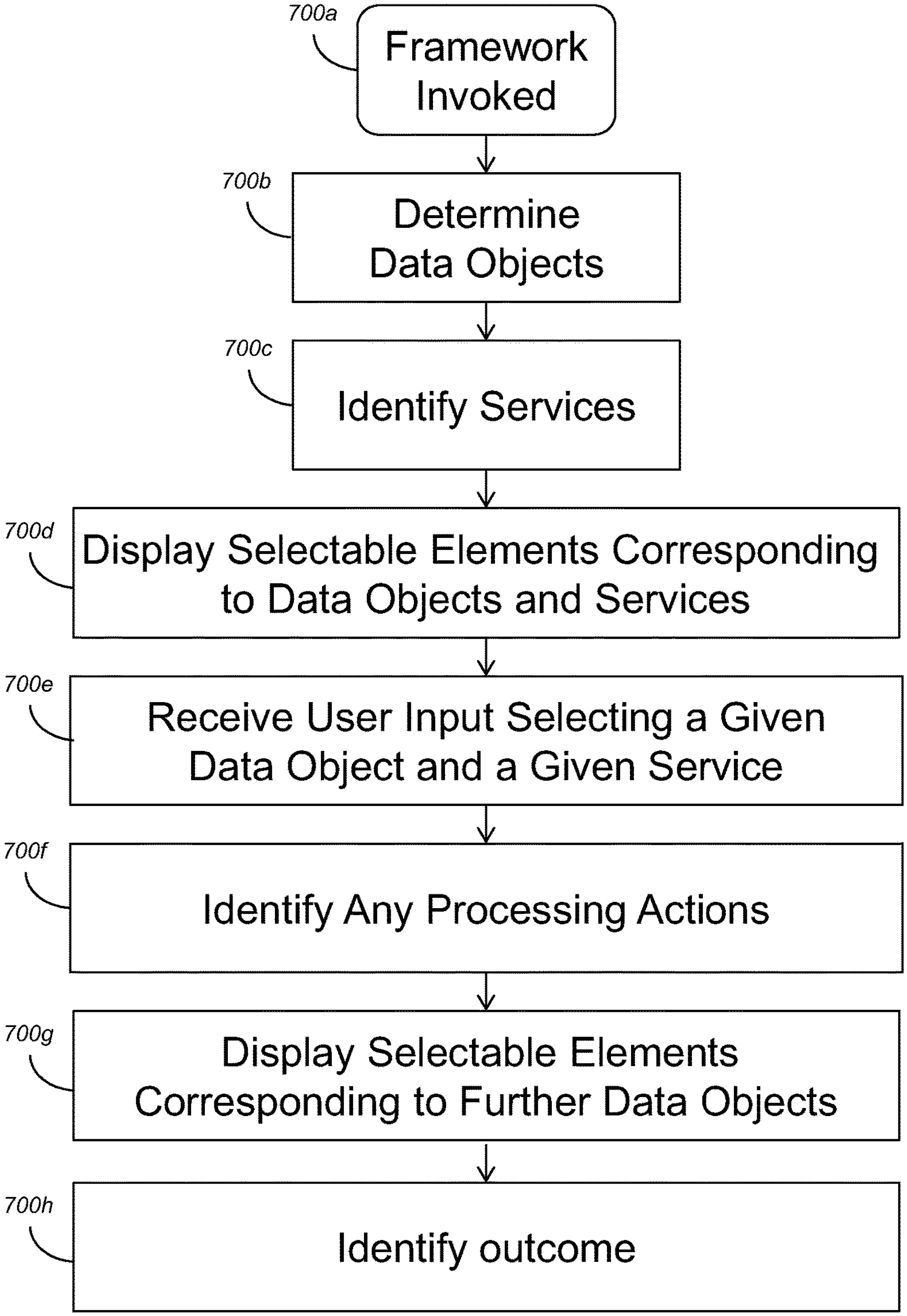
FIG. 7*a* illustrates an example of a process flow according to embodiments.

In some embodiments, each of the one or more fourth selectable elements may correspond to one or more further data objects, with the corresponding outcome data entry indicating that further processing actions may be performed, upon selection of one or more of the fourth selectable elements. According to embodiments, the further data objects may be created and/or maintained during the normal operation of a receiver application. In further embodiments, the further data objects may be created during a registration process of the corresponding receiver application. FIG. 7*a* illustrates an exemplary process flow according to embodiments. The framework is invoked at step 700*a*, and the one or more data objects are determined at step 700*b*.

On the basis of the determined one or more data objects and on the data entries, one or more services that are configured to process at least one of the determined one or more data objects are identified at step 700*c*. Having identified the one or more services, the framework may display at step 700*d*, on a display 116 of user terminal 100, one or more first selectable elements corresponding to at least one of the identified one or more services and one or more second selectable elements corresponding to at least one of the determined one or more data objects for selection by a user of the user terminal 100.

At step 700*e*, user input is received, identifying selection of a given data object and a given service. Having identified the given data object and the given service at step 700*e*, the data store is checked to determine whether there are any action data entries that correspond to the service data entry indicating the selected service. If a corresponding action data entry is found, any associated processing actions to be carried out are identified in step 700*f*. If the identified processing actions comprise displaying selectable elements corresponding to further data objects, the framework may display at step 700*g*, on a display 116 of user terminal 100, one or more fourth selectable elements corresponding to at least one of the further data objects for selection by a user of the user terminal 100.

At step 700*h*, the outcome of the interaction is identified with reference to an outcome data entry corresponding to the identified processing action. In this case, the identified outcome may be to continue the interaction (processing), and a further data structure (map) may be identified to facilitate same.

Figure 7C:
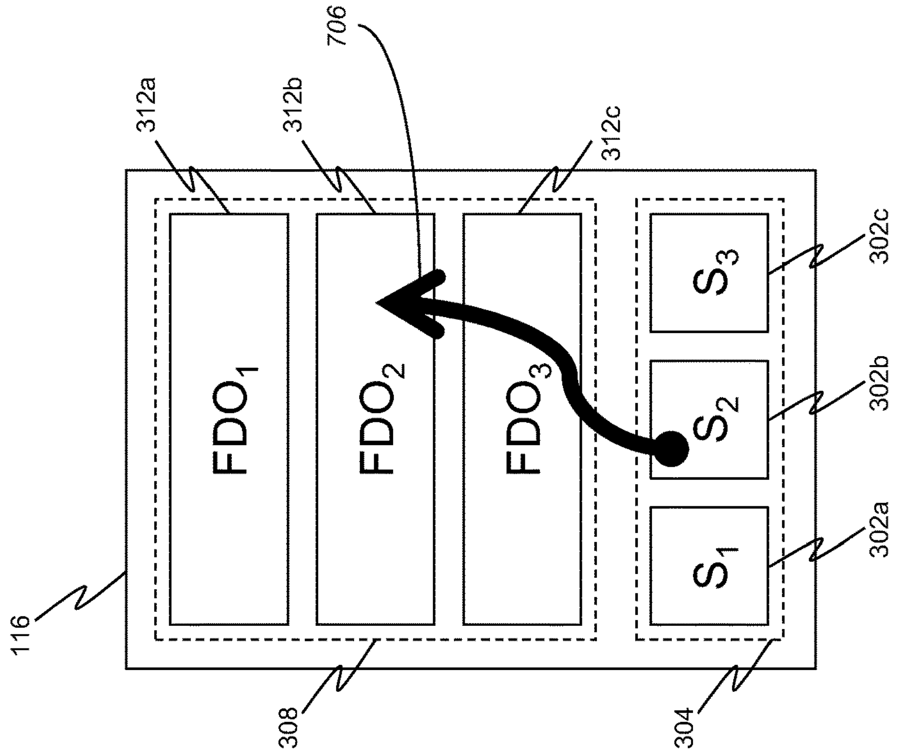
FIGS. 7*b* and 7*c* illustrate an example of a selection of a given data object, a given service and a given further data object on the display of the user terminal.
Figure 7B:
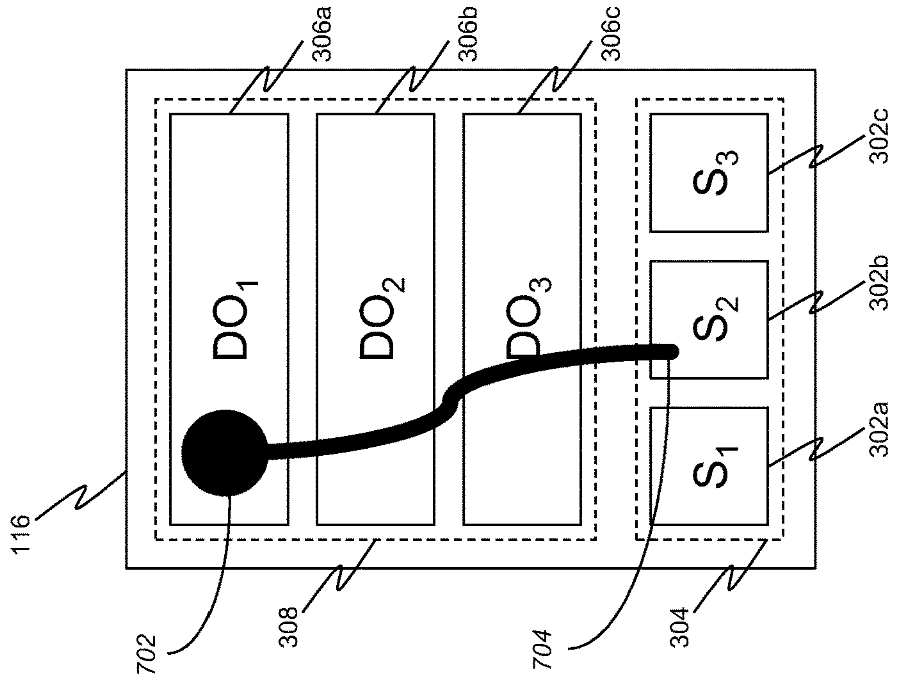

FIGS. 7*b* and 7*c* illustrate an exemplary selection of a given data object, a given service and a given further data object on the display of user terminal 100, corresponding to the process described above in relation to FIG. 7*a*. In FIG. 7*b*, the user initiates the drag and drop operation by making contact with the selectable element corresponding to the given data object (in this case selectable element 306*a*, corresponding to data object $DO_1$), as shown by the circle 702, thereby identifying selection of the given data object. The user progresses the drag and drop operation by moving to the selectable element corresponding to the given service (in this case selectable element 302*b*, corresponding to service $S_2$), maintaining contact with the touch sensitive display throughout. The user pauses contact with the touch sensitive display over selectable element 310*b*, as shown at step 704, thereby identifying selection of the given service.

The drag and drop operation continues in FIG. 7*c*. Having identified selection of the given service, the fourth selectable elements 312*a*, 312*b* and 312*c* are displayed. In the embodiments shown in FIG. 7*b*, the fourth selectable elements are displayed in the second display region 308 in replacement of the previously displayed second selectable elements. In alternative embodiments the fourth selectable elements may be displayed in a further region of the display (not shown). Since in this case the interaction may continue (as indicated by the corresponding outcome data entry) the user may progress the drag and drop operation by moving to the selectable element corresponding to the given further data object (in this case selectable element 312*b*, corresponding to service $S_2$), maintaining contact with the touch sensitive display throughout. The user completes the drag and drop operation by releasing contact with the touch sensitive display over selectable element 312*b*, as shown by step 706, thereby identifying selection of the given further data object.

For example, the user may select a document (data object) at step 702, and drag onto the "print" service at step 704. Selection of the print service may be configured (via processing actions) to cause selectable elements, each corresponding to a configured printer (further data objects), to be displayed. The user may select a printer in step 706, in response to which, printing of the selected document in initiated at the selected printer. In some embodiments, the further data objects may be dynamically updated by the receiver application. For example, the displayed printers may only include printers that are currently available, in which case the application which provides the printing service may dynamically determine which printers are available and update the further data objects accordingly.

In alternative arrangements, the action data entries may indicate one or more processing actions for performance on selection of an application of the one or more applications. In such arrangements, each action data entry may be associated with one or more application data entries, the correspondence being determined on the basis of which further processing actions should be performed upon selection of the application indicated by a given service data entry.

Figure 8A:
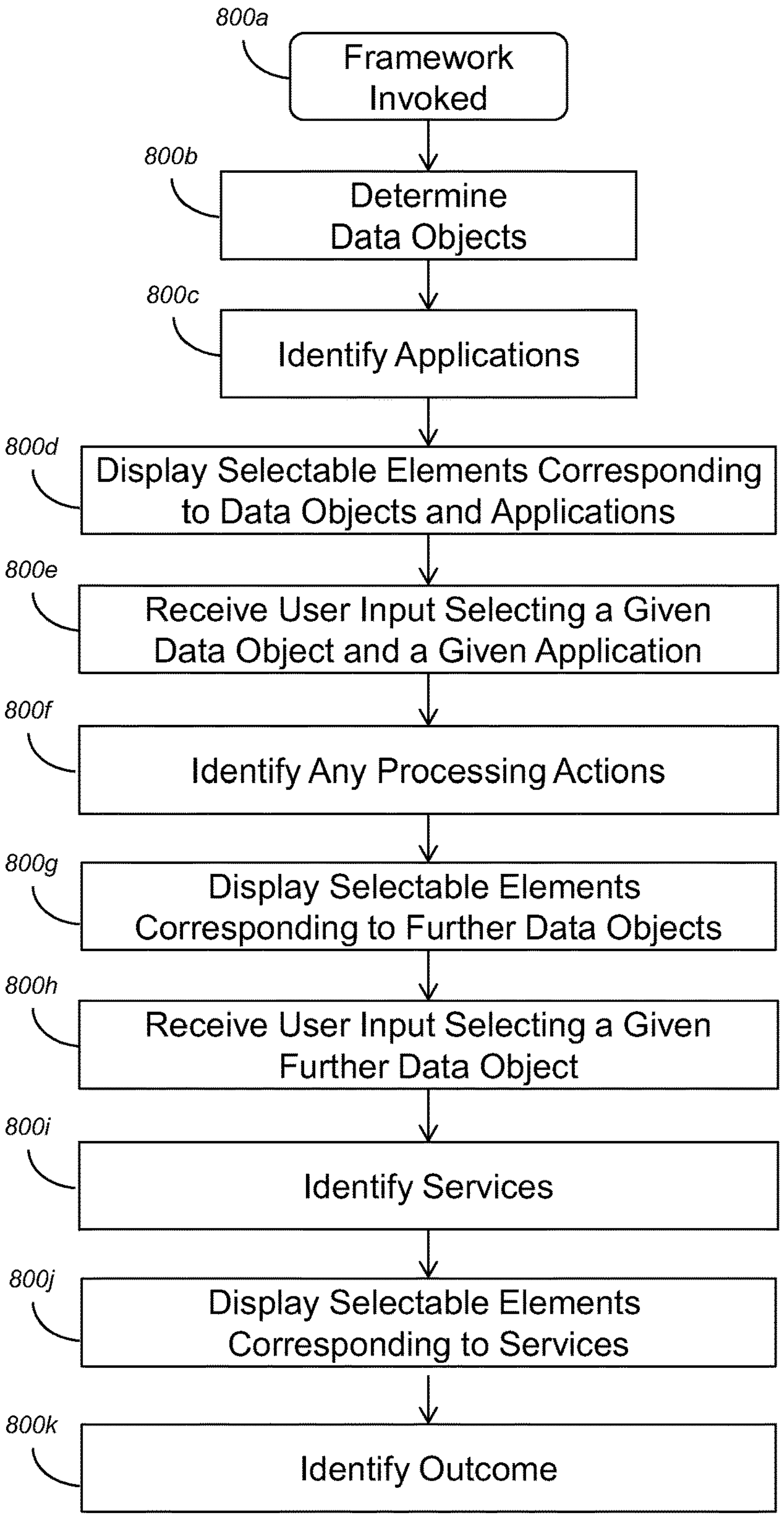
FIG. 8*a* illustrates an example of a process flow according to embodiments.

FIG. 8*a* illustrates an example process flow according to embodiments. The framework is invoked at step 800*a*, and the one or more data objects are determined at step 800*b*. On the basis of the determined one or more data objects and on the data entries, one or more applications that are configured to process at least one of the determined one or more data objects are identified at step 800*c*. Having identified the one or more applications, the framework may display at step 800*d*, on a display 116 of user terminal 100, one or more third selectable elements corresponding to at least one of the identified one or more applications and one or more second selectable elements corresponding to at least one of the determined one or more data objects for selection by a user of the user terminal.

At step 800*e*, user input is received, identifying selection of a given data object and a given application. Having identified the given data object and the given application at step 800*e*, the data entries are checked to determine whether there are any action data entries that correspond to the application data entry indicating the selected application. If a corresponding action data entry is found, any associated processing actions to be carried out are identified in step 800*f*. If the identified processing actions comprise displaying selectable elements corresponding to further data objects, the framework may display at step 800*g*, on a display 116 of user terminal 100, one or more fourth selectable elements corresponding to at least one of the further data objects for selection by a user of the user terminal.

At step 800*h*, user input is received, identifying selection of a given further data object. Having identified the given further data object, one or more services are identified in step 800*i*, on the basis of the data entries and the selected application, data object and/or data further object. Identification of the services may comprise comparing the characteristics of the given data object or further data object with the characteristics of data objects indicated by the characteristic data entries (as described above). Having identified one or more services at step 800*i*, the framework may display at step 800*j*, on a display 116 of user terminal 100, one or more first selectable elements corresponding to at least one of the identified one or more services for selection by a user of the user terminal. At step 800*k*, the outcome of the interaction is identified.

Figure 8C:
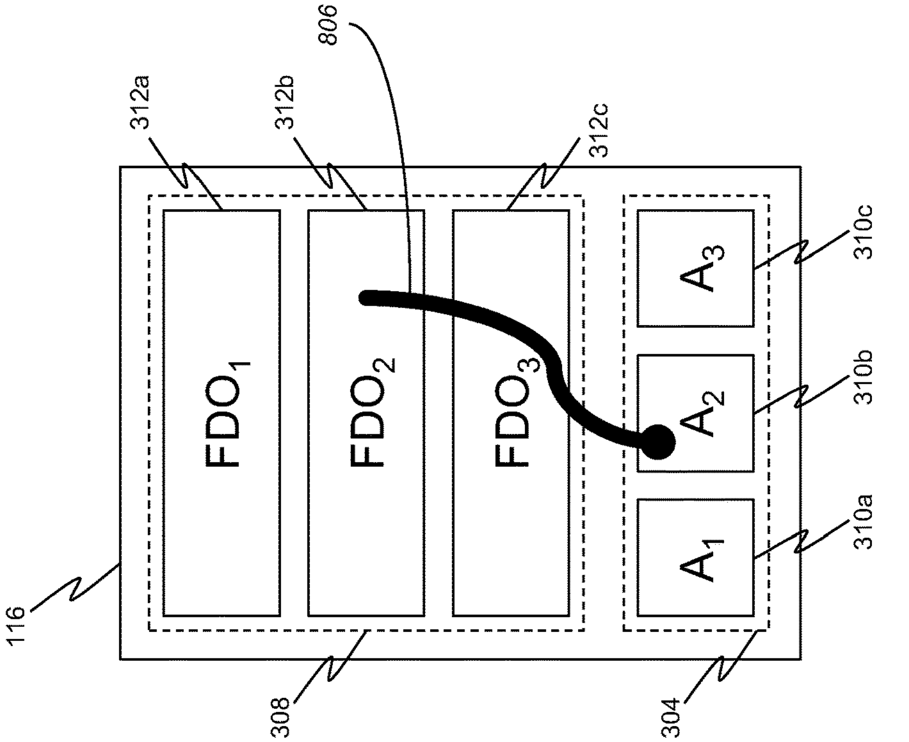
FIGS. 8*b*, 8*c* and 8*d* illustrate an example of a selection of a given data object, a given application, a given further data object and a given service on the display of the user terminal.
Figure 8B:
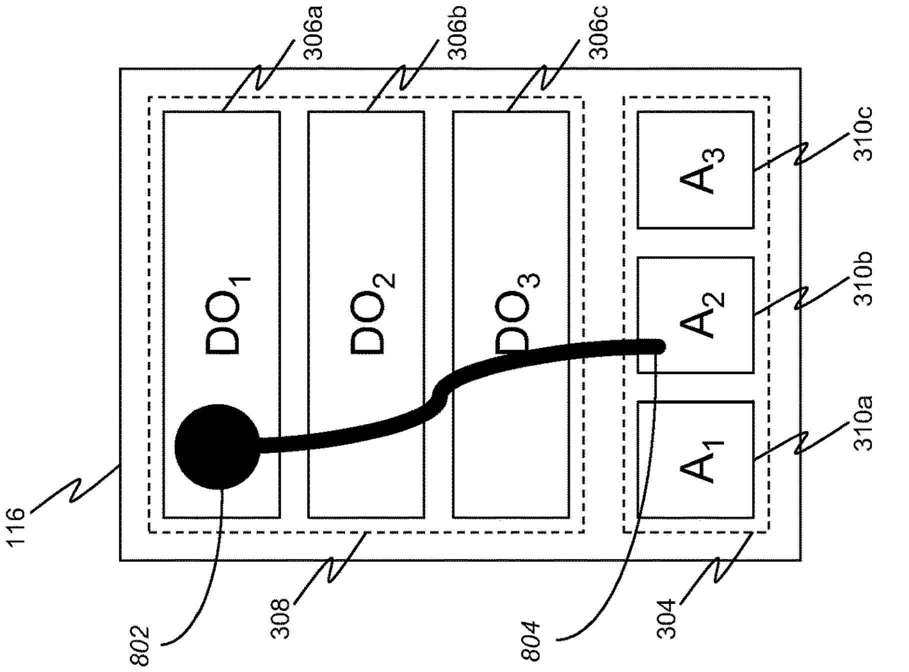
Figure 8D:
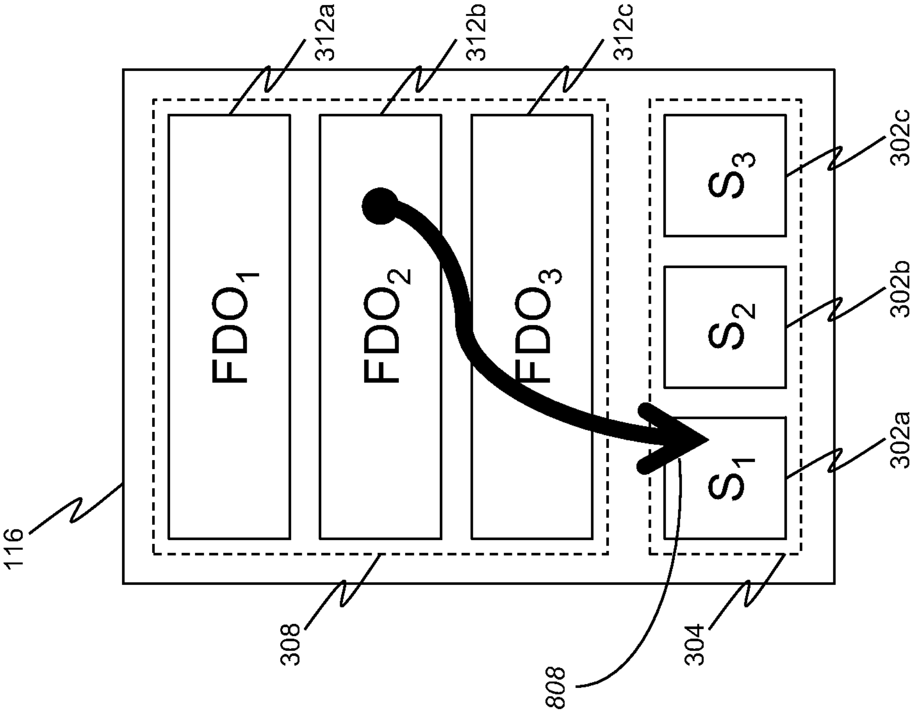

FIGS. 8*b*, 8*c* and 8*d* illustrate an exemplary selection of a given data object, a given application, a given further data object and a given service on the display of user terminal 100 corresponding to the process of FIG. 8*a*, wherein the third selectable elements (i.e. corresponding to the identified applications) are displayed for selection prior to the display of the first selectable elements (i.e. corresponding to the identified services). In FIG. 8*b*, the user initiates the drag and drop operation by making contact with the selectable element corresponding to the given data object (in this case selectable element 306*a*, corresponding to data object $DO_1$), as shown by the circle 802, thereby identifying selection of the given data object. The user progresses the drag and drop operation by moving to the selectable element corresponding to the given application (in this case selectable element 310*b*, corresponding to application $A_2$), maintaining contact with the touch sensitive display throughout. The user pauses contact with the touch sensitive display over selectable element 310*b*, as shown at step 804, thereby identifying selection of the given application.

The drag and drop operation continues in FIG. 8*c*. Having identified selection of the given application, the fourth selectable elements 312*a*, 312*b* and 312*c* are displayed. In the embodiments shown in FIG. 8*b*, the fourth selectable elements are displayed in the second display region 308 in replacement of the previously displayed second selectable elements. In alternative embodiments the fourth selectable elements may be displayed in a further region of the display (not shown). The user progresses the drag and drop operation by moving to the selectable element corresponding to the given further data object (in this case selectable element 312*b*, corresponding to service $S_2$), maintaining contact with the touch sensitive display throughout, thereby identifying selection of the given further data object, as shown by step 806.

The drag and drop operation continues in FIG. 8*d*. Having identified selection of the given further data object, the first selectable elements 302*a*, 302*b* and 302*c* are displayed. In the embodiments shown in FIG. 8*d*, the first selectable elements are displayed in the first display region 304 in replacement of the previously displayed third selectable elements. In alternative embodiments the first selectable elements may be displayed in a third region of the display (not shown). The user progresses the drag and drop operation by moving to the selectable element corresponding to the given service (in this case selectable element 302*a*, corresponding to service $S_1$), maintaining contact with the touch sensitive display throughout. The user completes the drag and drop operation by releasing contact with the touch sensitive display over selectable element 302*a*, as shown by step 808, thereby identifying selection of the given service.

By way of example, the user may select an image (data object) at step 802, and drag onto the contacts application in step 804. Selection of the contacts application may be configured (via processing actions) to cause selectable elements, each corresponding to a contact entry (further data objects), to be displayed. The user may select a given contact entry in step 806, in response to which, the available services provided by the contacts application for the selected image (data object) and contact entry (further data object) may be displayed. The user may then select the "set as contact image" service in step 808, and in response to completion of the user input, the processing of the selected data object (image) according to the selected service (set as contact picture) and processing parameters defined through selection of the further data object (i.e. for the selected contact) is initiated.

As described above, in cases where the relevant outcome data entry indicates that the interaction (processing) is to continue, the data store 200 may reference further data entries (e.g. a further map) which indicate one or more further processing actions. For example, the further processing actions may be for performance on selection of a further data object of said one or more further data objects. According to such embodiments, upon receiving user input identifying selection of the given further data object, the framework identifies, based on at least the further action data entries and the user input identifying selection of the given service, one or more further processing actions to be performed. The identified further processing actions may then be performed in response to their identification.

For example, again with reference to FIGS. 8*b* to 8*d*, the user may select a file (data object) at step 802, and drag onto the contacts application in step 804. Selection of the contacts application may be configured (via processing actions) to cause selectable elements, each corresponding to a contact entry (further data objects), to be displayed. The user may select a given contact entry in step 806, in response to which, the available services provided by the contacts application for the selected file (data object) and contact entry (further data object) may be displayed. The user may then select the "send file to contact" service in step 808, and the framework identifies, based on at least the further action data entries and the user input identifying selection of the given service, that one or more further processing actions are to be performed. In this case, the further processing actions may comprise partly filling a template message to send the selected file to the selected contact. According to some embodiments, the identified further processing actions are performed at least partly on the basis of one or more characteristics of the selected further data object. For example, if the selected contact entry is associated with an email address, a template email may be generated. However, if the contact is associated with a mobile telephone dialing number, a template MMS message may be generated. According to some embodiments, the identified processing action may comprise populating the selected further data object with data from the given data object. Hence, the dialing number or the email address associated with the selected contact entry may be entered into the generated template message.

In cases where more than one alternative further processing action may be identified, fifth selectable elements corresponding to the identified one or more further processing actions may be displayed for selection by the user. In response to receiving user input selecting a given identified further processing action, the given identified further processing action may be performed.

FIGS. 9*a*, 9*b*, 9*c* and 9*d* illustrate an example selection of a given data object, a given application, a given further data object, a given service and a given further processing action on the display of user terminal 100, wherein the third selectable elements (i.e. corresponding to the identified applications) are displayed for selection prior to the display of the first selectable elements (i.e. corresponding to the identified services). The user initiates the drag and drop operation by making contact with the selectable element corresponding to the given data object (in this case selectable element 306*a*, corresponding to data object $DO_1$), as shown by the circle 902, thereby identifying selection of the given data object. The user progresses the drag and drop operation by moving to the selectable element corresponding to the given application (in this case selectable element 310*b*, corresponding to application $A_2$), maintaining contact with the touch sensitive display throughout. The user pauses contact with the touch sensitive display over selectable element 310*b*, as shown at step 904, thereby identifying selection of the given application.

Figure 9A:
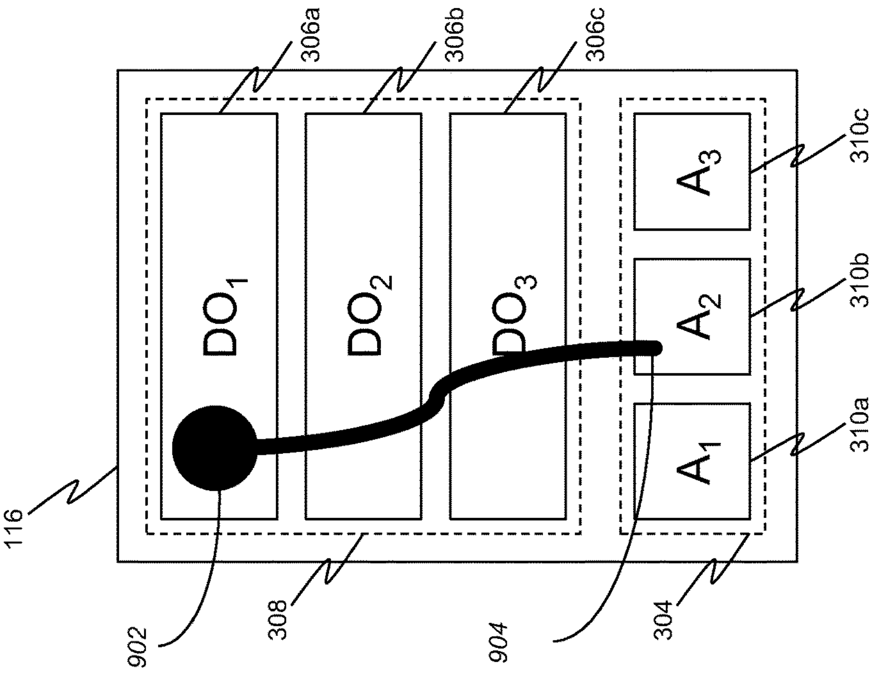
FIGS. 9*a*, 9*b*, 9*c* and 9*d* illustrate an example of a selection of a given data object, a given application, a given further data object, a given service and a given further processing action on the display of the user terminal.
Figure 9B:
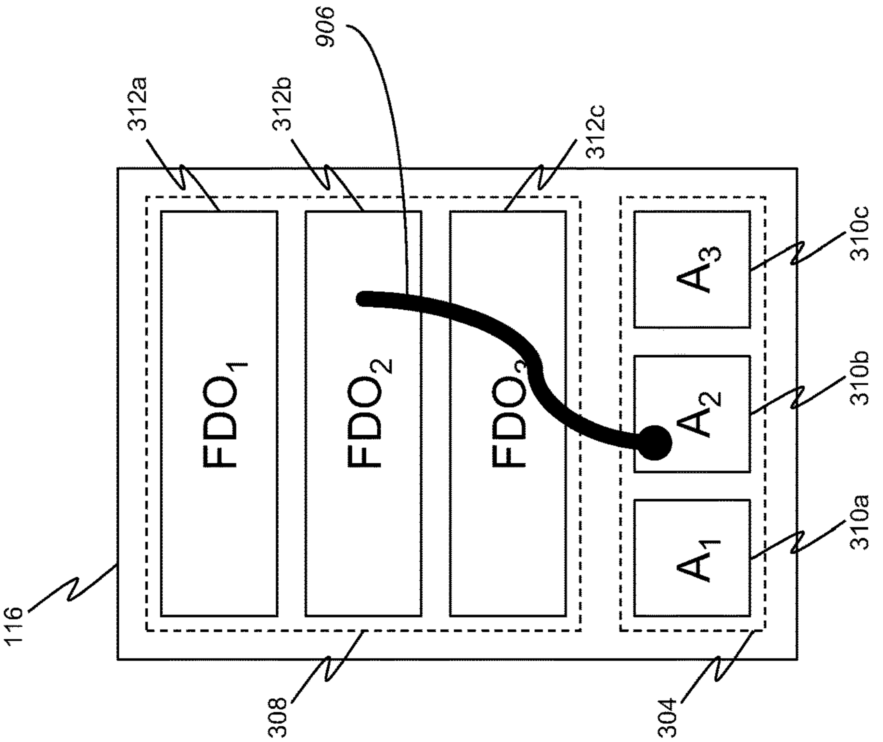

The drag and drop operation continues in FIG. 9*b*. Having identified selection of the given application, the fourth selectable elements 312*a*, 312*b* and 312*c* are displayed. In the embodiments shown in FIG. 9*b*, the fourth selectable elements are displayed in the second display region 308 in replacement of the previously displayed second selectable elements. In alternative embodiments the fourth selectable elements may be displayed in a further region of the display (not shown). The user progresses the drag and drop operation by moving to the selectable element corresponding to the given further data object (in this case selectable element 312*b*, corresponding to service $S_2$), maintaining contact with the touch sensitive display throughout, thereby identifying selection of the given further data object, as shown by step 906.

Figure 9D:
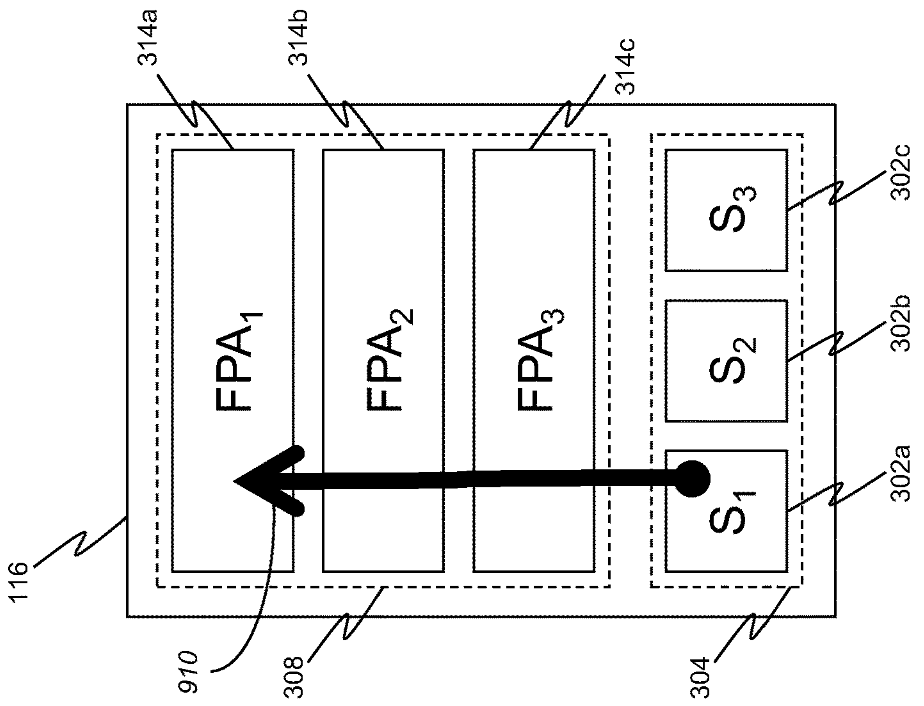
Figure 9C:
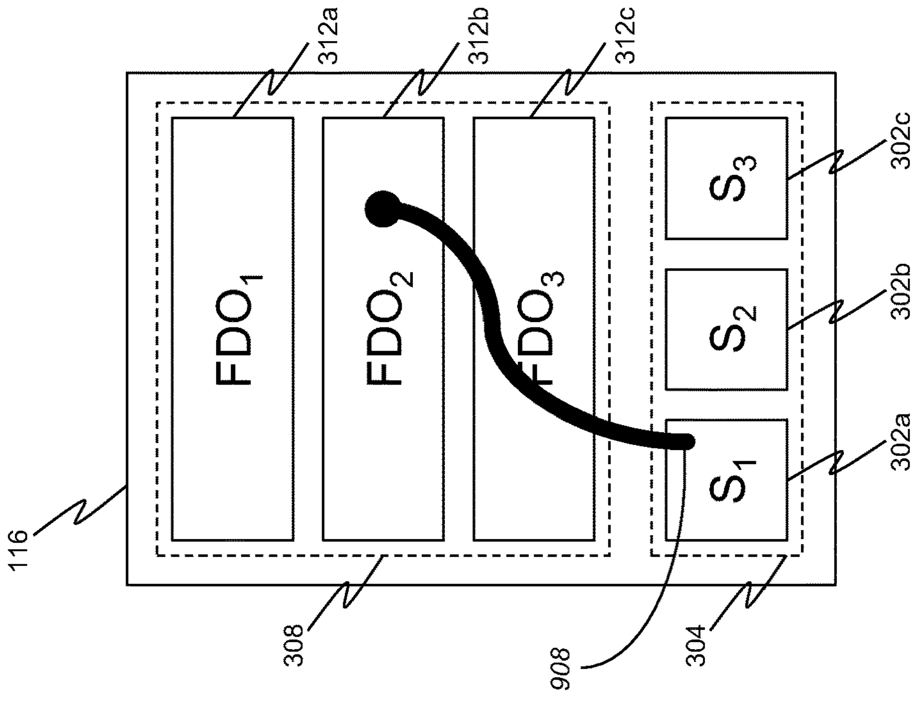

The drag and drop operation continues in FIG. 9*c*. Having identified selection of the given further data object, the first selectable elements 302*a*, 302*b* and 302*c* are displayed. In the embodiments shown in FIG. 9*c*, the first selectable elements are displayed in the first display region 304 in replacement of the previously displayed third selectable elements. In alternative embodiments the first selectable elements may be displayed in a third region of the display (not shown). The user progresses the drag and drop operation by moving to the selectable element corresponding to the given service (in this case selectable element 302*a*, corresponding to service $S_1$), as shown by step 908, maintaining contact with the touch sensitive display throughout.

The drag and drop operation continues in FIG. 9*d*. Having identified selection of the given service, the fifth selectable elements 314*a*, 314*b* and 314*c* are displayed. In the embodiments shown in FIG. 9*d*, the fifth selectable elements are displayed in the second display region 304 in replacement of the previously displayed fourth selectable elements. In alternative embodiments the fifth selectable elements may be displayed in a yet further region of the display (not shown). The user progresses the drag and drop operation by moving to the selectable element corresponding to the given further processing action (in this case selectable element 314*a*, corresponding to further processing action $FPA_1$), maintaining contact with the touch sensitive display throughout. The user completes the drag and drop operation by releasing contact with the touch sensitive display over selectable element 314*a*, as shown by step 910, thereby identifying selection of the given further processing action.

For example, the user may select a file at step 902, the contacts application at step 904, a given contact at step 906, the "send file to contact" service at step 908, and in response, the various contact options available for the given contact may be displayed, on the basis of the fifth selectable elements. At step 910, the user may select a specific contact option for the given contact and thereby trigger the associated further processing action, e.g. population of the selected contact option into a template message. Further, the type of contact option (e.g. mobile telephone dialing number or email address) may determine the type of template message that is generated (e.g. MMS or email).

It will be appreciated that in this manner, by defining yet further processing options through the use of yet further data entries, an indefinite number of further iterations of selections can be configured to select additional or more specific processing parameters. By using the registration process described above, detailed processing parameters can be defined even before the given application is launched. As a result of this, the given application need not be launched until after the end of the user input selection process. In some embodiments, the given application is launched in response to completion of the user input selection process. However, in alternative embodiments, the application may be launched during the selection process, or may even be running prior to the user input selection process commencing.

In some embodiments, the data entries corresponding to one or more of the available services, processing actions, further data objects and further processing actions may be updated in response to a change in the availability of the available services, processing actions, further data objects or further processing actions offered by the corresponding application. In some embodiments, the updating comprises re-performing a registration of the application. For example, if a new contact entry is added to a list of contact entries maintained by the contacts application, the contacts application may perform a further registration process to update the data entries in the data store accordingly.

It will also be appreciated from the various embodiments described above that the ordering of the steps in the selection process is not fixed, but can be adapted to suit the needs of the environment and application in which the framework is deployed.

In some embodiments, selectable elements corresponding to applications and services may both be displayed alongside the selectable elements corresponding to data objects. The ordering of the steps in the selection process may then depend on whether a service or an application is selected by the user.

In some embodiments, the services that are identified for selection by the user are services that may be performed in relation to at least one of the determined data objects. In alternative embodiments, the services that are identified for selection by the user are services that may be performed in relation to all of the determined data objects. In some embodiments, the applications that are identified for selection by the user are applications that configured to process at least one of the determined data objects. In alternative embodiments, the applications that are identified for selection by the user are applications that configured to process all of the determined data objects.

In some arrangements wherein two or more data objects are determined for selection by a user, the two or more data objects may include data objects having different data object characteristics. That is to say that the two or more data objects may include a first data object having first data object characteristics and a second data object having second data object characteristics, where the second data object characteristics are different from the first data object characteristics. In such cases, the framework may identify applications or services that are each compatible with data objects having either the first data object characteristics or the second data object characteristics (or both).

In embodiments, based on the data object characteristics of the determined two or more data objects, two or more of the plurality of applications configured for use by user terminal 100 are identified, where each of the identified two or more applications are configured to process at least one of the two or more data objects. Of the identified two or more applications, at least one application is configured to process data objects having the first data object characteristics and at least one application is configured to process data objects having the second data object characteristics. A plurality of selectable elements are then displayed on a display of the user terminal 100 for selection by a user, including selectable elements corresponding to the two or more data objects and selectable elements corresponding to the identified two or more applications. In this manner, it can be ensured that whichever data object among the two or more determined data objects is selected by the user, there is at least one application displayed that is compatible with the selected data object.

Similarly, in further embodiments, based on the data object characteristics of the determined two or more data objects, two or more of the plurality of services available to user terminal 100 may be identified, where each of the identified two or more service that may be performed in relation to at least one of the two or more data objects. Of the identified two or more services, at least one service may be performed in relation to data objects having the first data object characteristics and at least one service may be performed in relation to data objects having the second data object characteristics. A plurality of selectable elements may then displayed on a display of the user terminal 100 for selection by a user, including selectable elements corresponding to the two or more data objects and selectable elements corresponding to the identified two or more services. In this manner, it can be ensured that whichever data object among the two or more determined data objects is selected by the user, there is at least one service displayed that is compatible with the selected data object.

In some such embodiments, upon receipt of user input identifying selection of one of the data objects, the displayed plurality of selectable elements corresponding to the identified two or more applications (or services) are modified. The modification may comprise providing a visual indication on the display of the user terminal that at least one of the identified two or more applications (or services) is not configured to process the first data object. In this manner, the user is informed of the applications (or services) that are compatible with the selected data object before attempting completion of the user input, thereby deterring the user from attempting to select an application (or service) that is incompatible with the selected data object. The visual indication may comprise masking plurality of selectable elements corresponding to the at least one application that is not configured to process the first data object, for example by removing them from the display or by applying a grey filter.

The modification may alternatively comprise replacing at least one selectable element corresponding to an application (or service) that is not configured to process the first data object with at least one selectable element corresponding to at least one further application (or service) that is capable of processing the first data object. Hence, the user may be offered a selection of applications (or services) that are more relevant to the selected data object. According to some embodiments, the locations on the display of the user terminal of one or more selectable elements that correspond to one or more applications (or services) that are configured to process the first data object stay substantially the same after said modification. If the user input comprises a drag and drop operation, the constant location of the selectable elements improves the ease with which the drag and drop operation may be completed, as the destination may be the same as when the drag and drop operation was initiated.

Until now applications have been described as registering as being configured to process data objects having certain data object characteristics. In some arrangements, applications may have more than one kind of relationship with data objects having certain data object characteristics. For example, in such embodiments applications may also register as being relevant to data object having certain data object characteristics, but not configured to process data objects having those data object characteristics. For example, the calendar application may register as being relevant to data objects that are SMS messages, as the user may wish to check their availability before deciding how to process a received SMS message. Hence, when SMS message data objects are determined by the framework, the calendar application may be displayed alongside applications that are capable of processing SMS data objects. Selection of the calendar application may then launch the calendar application for processing, but not for processing of the SMS data object.

Alternatively, the user may select the SMS data object and an application capable of processing it as described above. To enable this, the data store may comprise data entries indicating a plurality of applications configured for use by the user terminal, and for each of the plurality of applications the data store may further comprise corresponding data entries indicating one or more data object types with which the application has a first type of relationship (e.g. "relevant" only), and also corresponding data entries indicating one or more data object types with which the application has a second, different, type of relationship (e.g. capable of processing).

The different types of relationship may be defined by a corresponding outcome data entry. In the case of the first type of relationship, the outcome data entry may indicate that the interaction (processing) is to conclude with the receiver application opening, but without any processing of the selected data object.

Upon invocation of the framework, one or more data objects for selection by a user are determined, including at least a given data object. In embodiments, based on the data entries and the one or more determined data objects, at least a first application and a second application are identified, where the first application has the first type of relationship with the given data object and the second application has the second type of relationship with the given data object.

Two or more selectable elements corresponding to the identified applications may then be displayed on the display of user terminal 100, including at least a first selectable element corresponding to the first application and a second selectable element corresponding to the second application. In response to a user selection of the first selectable element, a first type of processing action may be performed, wherein the first type of processing action comprises initiating processing of the given data object using the first application. While in response to user selection of the second selectable element, a second type of processing action, different from the first type of processing action, may be performed, wherein the second type of processing action comprises triggering execution of the second application for processing of data different from the given data object.

Prior to performance of the first type of processing action, one or more further selectable elements corresponding to at least one of the identified data objects may be displayed on the display of the user terminal, including at least a third selectable element corresponding to the given data object, to enable selection of the given data object by the user. Hence, in some embodiments, the first type of processing action is performed in response to user selection of the third selectable element.

As the selection of a data object is only required for initiating performance of the first type of processing action, the displayed two or more selectable elements corresponding to the at least two identified applications may be modified in response to receiving user input identifying selection of the given data object. The modification may comprise providing a visual indication on the display of the user terminal that at least one of the identified one or more applications is not capable of processing the given data object. Alternatively the visual indication may comprise masking the one or more selectable elements corresponding to the at least one application having the second type of relationship with the given data object.

The modification may alternatively comprise replacing at least one selectable element corresponding to an application having the second type of relationship with the given data object, with at least one selectable element corresponding to at least one further application having the first type of relationship with the given data object. Hence, the user may be offered more applications that are configured to process the selected data object once the data object has been selected. Further, the locations on the display of user terminal 100 of the selectable elements that correspond to the at least one application having the first type of relationship with the given data object may stay substantially the same after said modification. If the user input comprises a drag and drop operation, the constant location of the selectable elements improves the ease with which the drag and drop operation may be completed, as the destination may be the same as when the drag and drop operation was initiated.

In any of the embodiments described above the number of selectable elements that may be displayed on the display of user terminal 100 may exceed the available space for displaying selectable elements. In that case, one of the selectable elements may be replaced with navigational elements, the selection of which may cause the display to scroll through further available selectable elements.

In some arrangements, the user may be enabled to select several of the determined data objects, for example by performing certain gestures on the display in relation to the corresponding selectable elements. In such cases, the subsequently selected applications or services may process all of the selected data objects. In some such embodiments, the displayed applications or services may be modified to display only those that are compatible with all of the selected data objects. This modification may comprise the types of visual indication previously discussed.

Data Objects

The term "data object" describes a data structure that may be processed by an application, perhaps according to a given service. In some embodiments, data objects may be files, such as documents or videos. However, in other embodiments, data objects may be data structures comprised with in a larger file, for example individual calendar entries stored within a calendar data file.

An application or service may register its compatibility with certain data objects on the basis of predetermined data object characteristics. Most simply, the predetermined characteristics of data objects comprise a data object type. In cases where the data object is a file, the data object type might comprise that file's file type (e.g. .mp3, .txt, etc.). For example, a word processing application may register that it is capable of processing data objects with the .doc file type.

Alternatively, characteristics of data object may be attribute-driven instead of (or as well as) type-driven. In such embodiments, the one or more predetermined characteristics of data objects may comprise at least one object attribute. The predetermined characteristics of data objects may comprise the presence of data of a given type within the associated data object. For example, an image editing application might be capable of processing any data object that includes image data, even if that data object is not an image object or an image file (such as a .jpg), e.g. a contact entry for a contacts application may comprise image data if the contacts application supports attaching an image to contact entries. Similarly, a music player application might be capable of processing any data object that comprises audio data (e.g. MPEG data), not merely audio objects or files (such as .mp3 files). Available object attributes may also include the size of the object. For example, an MMS (Multimedia Messaging Service) application may be capable of sending data objects that have a size of less than 20 kb as attachments. Further available parameters may be specific to a particular type of data object, or data objects comprising a particular type of data. For example a data object comprising image data may include an image dimension attribute. An audio or video file may include a duration attribute, as well as metadata such as artist, year of composition, language etc. A further common data object attribute is a creation date, which may also define an age of the associated data object.

Some display applications may be able to generate data object on the fly for passing to the framework. For example, an image processing application may have a variety of filters available to apply to a source image. Upon invocation of the framework from within the image processing application, the image processing application may pass identifiers to the framework that each correspond to a modified version of the source image with a different filter applied. Upon completion of the user selection process during the framework processing, the filter corresponding to the user's selection may be applied to the source image and passed to the selected receiving application for processing. In this manner, at least one of the one or more data objects is generated in response to selection of the corresponding selectable element by a user of the user terminal.

Example Applications

What follows is a series of examples illustrating different varieties of receiving applications that may operate in accordance with the embodiments described above.

The applications may include an email application for accessing, editing, sending and receiving data objects that are emails. Each email may include characteristics such as email subject, email attachments, email body, recipients, sender, date sent, etc. The email application may thus act as a display application by allowing the framework to be invoked with respect to data objects that are email messages.

The email application may also act as a receiver application by registering as being compatible with data objects having predetermined characteristics and provide services such as sending those data objects as attachments.

The applications may include a contacts application for accessing and editing one or more lists of contacts entries. Each list of contacts may comprise data objects that are contact entries, where each contact entry comprises characteristics relating to a contact which may include the contact's name, information relating to how that contact may be contacted via email, telephone, social networks, etc., the contact's postal address, company name, etc., as well as characteristics such as an image or notification tone associated with the contact. The contacts application may thus act as a display application by allowing the framework to be invoked with respect to data objects that are contact entries. The contacts application may also act as a receiver application by registering as being compatible with data objects having predetermined characteristics and provide services such as sending those data objects to contacts, assigning data objects as contact images or notification alerts etc.

The applications may include a calendar application for accessing and editing one or more calendars. Each calendar may comprise data objects that are calendar entries, where each calendar entry may include characteristics such as a calendar entry subject, a location associated with the entry, start and end times for the calendar entry, a list of contacts associated with the entry, etc. The calendar application may thus act as a display application by allowing the framework to be invoked with respect to data objects that are calendar entries. The calendar application may also act as a receiver application by registering as being compatible with data objects having predetermined characteristics and provide services such as generating calendar entries on the basis of those data objects.

The applications may include a tasks application for accessing and editing one or more tasks lists. Each task list may comprise task entries, where each task entry may include characteristics such as a task subject, a task due date, a list of other entities such as contacts, emails or documents associated with the task, etc. The tasks application may thus act as a display application by allowing the framework to be invoked with respect to data objects that are task entries. The tasks application may also act as a receiver application by registering as being compatible with data objects having predetermined characteristics and provide services such as generating task entries on the basis of those data objects.

The applications may include a document manager application for accessing and editing one or more data objects which are documents. Each document may include characteristics such as one or more document types (e.g. formatted text, spreadsheets, drawings, images, presentations, audio and/or video), and/or may include document characteristics associated with each of these document types (e.g. has spreadsheet data, has plain text data, has rich text data etc.). Each document may also include characteristics including who owns, has created, and/or has access to the document. The document manager application may thus act as a display application by allowing the framework to be invoked with respect to data objects that are documents. The document manager application may also act as a receiver application by registering as being compatible with data objects having predetermined characteristics and provide services such as editing those data objects, generating documents on the basis of those data objects etc.

The applications may include a messaging application for accessing, editing, sending and receiving data objects that are messages. Each message may comprise characteristics such as a message type indicating whether the message is an SMS message, MMS message, instant message, etc., as well as the address of the sender or recipient(s) of the message, when it was sent, etc. The messaging application may be configured to use the network interface of the portable computing device to send and/or receive these messages. Instant messages may be sent and/or received via instant messaging services available via the communications network 140 such as Skype, Yahoo! Messenger, etc. The message application may thus act as a display application by allowing the framework to be invoked with respect to data objects that are messages. The message application may also act as a receiver application by registering as being compatible with data objects having predetermined characteristics and provide services such as sending those data objects as message attachments.

The applications may include a multimedia application for accessing data objects that are multimedia objects, such as songs or videos. Each multimedia object may comprise characteristics such as a duration, genre, artist, language, resolution, bit-rate, album title etc. The multimedia application may thus act as a display application by allowing the framework to be invoked with respect to data objects that are multimedia objects. The multimedia application may also act as a receiver application by registering as being compatible with data objects having predetermined characteristics and provide services such as initiating playback of those data objects, adding those data objects to a playlist etc.

The applications may include a file browser application for accessing, editing, sending and receiving data objects that are files. Each file may comprise characteristics such as a title, file type, created date, creator etc. The file browser may thus act as a display application by allowing the framework to be invoked with respect to data objects that are files.

Example Registered Map Structure 1

An example of a mapping for a receiver application that may be created during a registration process is now described in the context of a contacts application. The exemplary contacts application provides a service for adding photographs to individual contact entries in a contacts list maintained by the contacts application. In the example, the service is limited to images that are 200 KB or less in size. The mapping registered by the contacts application may comprise storing the following data entries in the data store of the user terminal as a top-level map:

Service Name: Set Photo

Value: Processing—set photo

Characteristics Required: Object Type is Image AND Size Attribute<=200 KB

Outcome: Continue the interaction, with the SetPhotoMap, as defined below.

Note that in this, and subsequent examples, the service name, value, characteristics required, and outcome data entries may correspond to the service 204, processing actions 208, data object characteristics 206 and outcome 210 data entries described above with reference to FIG. 2.

The application also registers a mapping identified as SetPhotoMap, which is a sub-map referenced by the top-level map as described above. The application registers a further data object map for each contact entry in the contacts list in SetPhotoMap. The registration of these maps may comprise storing the following data entries in the data store 200 of the user terminal 100:

Further Data Object Name: The display name of the contact

Value: Subject—An internal reference to the contact's record in the address book database Characteristics Required: None Outcome: Completes the interaction.

In some embodiments, the SetPhotoMap is updated whenever a contact is added, removed, or has their display name changed (e.g. via a further registration process).

Example Invocation Process 1

The mapping registered for the exemplary contacts application described above may be invoked, for example, through the following invocation process:

Using a photo gallery display application, the user navigates to a folder that contains the following images: Image1, which has size of 2 MB, and Image2, which has size of 150 KB. The framework is invoked from within the display application, which results in the two image data objects being identified to the framework.

Selectable elements corresponding to the image data objects may then be displayed on the display 116 of the user terminal 100. The characteristics of data objects defined in the top level of all registered mappings in the data store 200 are then checked. For the contacts application's Set Photo service described above, the data objects are checked to identify whether there is at least one object of type "Image" in the object list with a size of 200 KB or less. As this condition is met because of Image2, a selectable element corresponding to the Send Image service may be displayed on the display 116 of the user terminal 100.

If the user initiates an interaction by selecting the selectable element corresponding to Image1, the selectable element corresponding to the Send Image service is disabled (e.g. not displayed, masked etc.), because Image1 does not meet the predetermined characteristics defined in the data entries for the Set Photo service. However, if the user initiates the interaction by selecting the selectable element corresponding to Image2, the selectable element corresponding to the Send Image service remains enabled because Image2 meets the predetermined criteria of the Send Image service.

The user continues the interaction by selecting the selectable element corresponding to the Set Photo service. As a result, the SetPhotoMap is now processed, and selectable elements corresponding to the further data objects (i.e. individual contact entries) are displayed on the display 116 of the user terminal 100. Filtering may take place at this point in relation to the further data objects in SetPhotoMap. However, since in this example there are no further conditions defined, none need to be filtered out and all may be displayed.

The user continues the interaction by selecting a given contact (e.g. Contact1), the outcome of which, as defined in the mapping, is to complete the interaction. Processing of Image1 by the contacts application according to the Send Image service is then initiated. This may be achieved by passing the following parameters to the receiver application (i.e. the contacts application):

Object=Image2.

Subject=Contact1.

This completes the framework processing (after which control of the processing resides with the receiver application). The contacts application may, for example, continue the processing by opening a confirmation user interface, which allows the user to confirm whether the selected image should be added to the appropriate contact entry in the contacts list.

Example Registered Map Structure 2

A further example of a mapping for a receiver application that may be created during a registration process is now described in the context of a further contacts application. This exemplary contacts application supports sending image data objects to email addresses as well as mobile telephone numbers of contacts. If sending an image data object to a contact's mobile telephone number (e.g. via MMS), the exemplary contacts application registers as being compatible with image data objects that have a size characteristic of 1 MB or less. This may be the assumed or actual capability of MMS as used by the contacts application. Alternatively, the limit may be imposed by a mobile network operator wishing to limit the size of messages sent by its customers. Alternatively still, the limit may be set by the contacts application developers for other reasons.

The mapping registered by the contacts application may comprise storing the following data entries in the data store 200 of the user terminal 100 as a top-level map:

Service Name: Send Image

Value: Processing—send image

Characteristics Required: Object Type is Image

Outcome: Continue the interaction, with the SendImageMap, as defined below.

The contacts application also registers a mapping identified as SendImageMap, which is a sub-map referenced by the top-level map as described above. The contacts application registers a further data object map for each contact in the contacts list in SendImageMap. The registration of these maps may comprise storing the following data entries in the data store 200 of the user terminal 100:

Further Data Object Name: <The display name of the contact>

Value: Subject—<internal reference to the contact's record in the contacts database>

Characteristics Required: None

Outcome: If the contact has at least one email address or mobile telephone numbers then the application registers an outcome to continue the interaction, with a mapping that is specific to the contact, SendImageContactZOptionsMap, as defined below. Otherwise, the application registers an outcome to cancel the interaction.

Note that if the contact has no email addresses or mobile phone numbers then the application may append text such as "Cannot send" when registering. Alternatively, that contact may be omitted from the SendImageMap.)

The application also registers a yet further data object mapping for each contact in the address book that has at least one email address or mobile telephone number, identified as SendImageContactZOptionsMap, where ContactZ is replaced by a unique identifier for the contact. The registration of these maps may comprise storing the following data entries in the data store 200 of the user terminal 100:

For each email address X:

Label: <The email address X itself or the part of it that distinguishes it from the other email addresses>.

Value: Option—the whole of address X

Characteristics Required: None

Outcome: Completes the interaction

For each mobile phone number Y:

Label: <The mobile telephone number Y itself or the part of it that distinguishes it from the other telephone numbers>.

Value: Option—the whole of mobile telephone number Y

Characteristics Required: Size<=1 MB

Outcome: Completes the interaction

Example Invocation Process 2

The mapping registered for the exemplary contacts application described directly above may be invoked, for example, through the following invocation process:

Using a file browser display application, the user navigates to a folder that contains two image data objects: Image1, which has size of 2 MB, and Image2, which has size of 150 KB. The framework is invoked from within the display application which results in the two image data objects being identified by the framework.

Selectable elements corresponding to the image data objects may then be displayed on the display 116 of the user terminal 100. The characteristics of data objects defined in the top level of all registered mappings in the data store 200 are then checked. For the contacts application's Send Image service described above, the data objects are checked to identify whether there is an object of type "Image" in the object list. As this condition is met, a selectable element corresponding to the Send Image service may be displayed on the display 116 of the user terminal 100.

The user initiates the interaction by selecting the selectable element corresponding to Image1. Since Image1 meets the condition of the Send Image service, the selectable element corresponding to the Send Image service remains enabled. The user continues the interaction by selecting the selectable element corresponding to the Send Image service. As a result, the SendImageMap is now processed, and selectable elements corresponding to the further data objects (i.e. individual contact entries) are displayed on the display 116 of the user terminal 100. The message "Cannot send" may be displayed against contacts entries that that have no stored mobile telephone numbers or email addresses.

The user continues the interaction by selecting a given contact (e.g. Contact1). If the given contact has no corresponding email address or mobile telephone number, a message may be displayed to say that the interaction will be cancelled. However, if the given contact has at least one email address or mobile telephone number, the SendImage-ContactlMap is then processed, and selectable elements corresponding to yet further data objects (i.e. the individual email addresses or mobile telephone numbers of the given contact) are displayed on the display 116 of the user terminal 100. As a result of this processing, the selectable elements corresponding to the yet further data objects are filtered based on the characteristics of data objects defined in the data entries. In this case, as the selected image data object, Image1, has a size characteristic greater than the 1 MB limit defined in the mapping for mobile telephone numbers, any selectable elements corresponding to mobile telephone numbers of Contact1 will be filtered out (e.g. not displayed, masked etc.). However, selectable elements corresponding to any email addresses of Contact1 are displayed and enabled.

The user continues the interaction by selecting the selectable element corresponding to Contact1email1, the result of which is to complete the interaction. Processing of Image1 by the contacts application according to the Send Image service is then initiated. This may be achieved by passing the following parameters to the receiver application (i.e. the contacts application):

Object=Image1.

Subject=Contact1.

Processing option=Contact1email1.

As a result of the initiation, the contacts application may open an email editor user interface. If so defined, further processing actions may be carried out as described previously. In this case, the To: address in the email editor user interface may be pre-populated with Contact1email1 and the draft email message may have a copy of Image1 as a file attachment. Creating the draft email message and opening the email editor completes the framework processing (after which control of the processing resides with the receiver application).

In some embodiments, the functions of the framework could be provided in one or more libraries or other modules for inclusion in display and receiver application code. One or more such libraries may provide the functions to display applications such as: map sharing, framework user interface display and processing, and map reading. Similarly, one or more such libraries may provide functions to receiver applications such as map sharing, map writing, and processing reference hooks.

As described in the examples above, the hierarchy of registered mappings could contain a large number of data entries. In the context of a "contacts" receiver application (such as described in the examples above), a user may have e.g. 50 contacts, each with an average of e.g. two e-mail addresses and two phone numbers. Hence, for the second example given above, there would be 50 mappings stored at one level, each with an average of four mappings at the next level down, giving a total of 250 items. If each mapping occupied 30 bytes on average, then a total of 7.5 KB would be occupied by the complete map registration. Even if every item in the upper level also had a thumbnail image of, on average, 3 KB in size, then the complete map registration would occupy an additional 150 KB and total 157.5 KB. Hence, at 157.5 KB, the complete registered map for the above example comprises a relatively low amount of data, which may be rendered and interpreted while placing a relatively low processing burden on the user terminal 100.

For larger maps, subdivision may be used to reduce the amount of data required for processing at any one time. For example, in the scenarios described above, only two levels of the hierarchy need to be displayed at any one time. Hence, a large map could be made easier to process by splitting it across additional levels. For example, if there were 500 contacts in the contacts application described above, this would give 2,500 items with a total size of 1.1 MB. In order to make this more manageable, an additional map could be introduced above the top level, in which each item corresponds to one or more letters of the alphabet: "ABC", "DEF", "GHI" etc. The contacts may then be placed in separate maps depending on the initial letter of their display names. In this way, the number of items and the total size of data that would require rendering in order to display any two levels of the hierarchy would be reduced. In some embodiments, a limit could be imposed on the size of any one map to prevent overburdening system resources. If a receiver registered a map that was beyond the safe size, then it may, for example, be omitted from the display. Further, the path of map items leading to an oversized map could also be omitted.

In accordance with some arrangements there is provided a method of selecting an application for processing of a data object on a user terminal, the method comprising: determining two or more data objects for selection by a user, said two or more data objects including a first data object having first data object characteristics and a second data object having second data object characteristics, the second data object characteristics being different from the first data object characteristics; identifying, based on the data object characteristics of the determined two or more data objects, two or more of a plurality of applications configured for use by the user terminal, each of the identified two or more applications being configured to process at least one of the two or more data objects, the identified two or more applications including at least one application configured to process data objects having the first data object characteristics and at least one application configured to process data objects having the second data object characteristics; and displaying, on a display of the user terminal, a plurality of selectable elements for selection by a user of the user terminal, including selectable elements corresponding to the two or more data objects and selectable elements corresponding to the identified two or more applications.

In some embodiments, the method comprises receiving user input identifying selection of a given data object of the two or more data objects and a given application of the identified two or more applications; and initiating processing of the given data object by the given application in response to said user selection.

In some embodiments, the user input identifying selection of the given data object and the given application comprises a drag and drop operation performed on said user terminal.

In some embodiments, the method comprises receiving first user input identifying selection of a first said data object, and modifying the displayed plurality of selectable elements corresponding to the identified two or more applications in response to receiving said first user input.

In some embodiments, the modification comprises providing a visual indication on the display of the user terminal that at least one of the identified two or more applications is not configured to process the first data object.

In some embodiments, the visual indication comprises masking plurality of selectable elements corresponding to the at least one application that is not configured to process the first data object.

In some embodiments, the locations on the display of the user terminal of one or more selectable elements that correspond to one or more applications that are configured to process the first data object stay substantially the same after said modification.

In some embodiments, the modification comprises replacing at least one selectable element corresponding to an application that is not configured to process the first data object with at least one selectable element corresponding to at least one further application that is capable of processing the first data object.

In some embodiments, one or more of the characteristics of data objects comprise a data object type.

In some embodiments, one or more of the characteristics of data objects comprise the presence of data of a given type within the associated data object.

In some embodiments, one or more of the characteristics of data objects comprise at least one object attribute.

In some embodiments, the at least one object attribute comprises one or more of: an object size, an object dimension, an object duration, and an object age.

In some embodiments, the method comprises: maintaining, on a data store, first data entries relating to said plurality of applications configured for use by the user terminal, and second data entries relating to one or more predetermined characteristics of data objects that each said application is capable of processing, each of the second data entries corresponding to one or more of the first data entries.

In some embodiments, said identification of two or more of the plurality of applications is performed on the basis of the data entries.

In some embodiments, each said data entry is generated during a registration process of the corresponding application.

In some embodiments, the method comprises maintaining, on the data store, third data entries relating to one or more services that may be executed by said plurality of applications in respect of data objects having one or more predetermined characteristics, each of the third data entries corresponding to one or more of the first and/or second data entries.

In some embodiments, the method comprises: receiving user input identifying selection of a given data object of the two or more data objects and a given application of the identified two or more applications; identifying, based on the data entries and the received user input identifying selection of the given data object and the given application, one or more services that the given application is configured to execute in respect of the given data object; and displaying, on a display of the user terminal, one or more selectable elements corresponding to at least one of the identified one or more services, the one or more selectable elements being for selection by a user of the user terminal.

In some embodiments, the method comprises: receiving user input identifying selection of a given service; and initiating performance of the given service in relation to the given data object by the given application.

In some embodiments, the given application is launched in response to receipt of the user input identifying selection of the given service.

In some embodiments, at least one of the two or more of said plurality of applications is configured to execute services on the user terminal.

In some embodiments, at least one of the two or more of said plurality of applications is configured to execute services remotely to the user terminal.

In some embodiments, initiating processing of the given data object by the given application comprises the given application sending a processing initiation message to a remote processing entity.

In some embodiments, said processing initiation message comprises the given data object.

In some embodiments, said processing initiation message comprises one or more processing parameters.

In some embodiments, determining the two or more data objects for selection by the user comprises receiving a list of data object identifiers from an initiating application on the user terminal, the list of data object identifiers comprising identifiers for at least the two or more data objects.

In some embodiments, at least one of the two or more data objects is generated in response to selection of the corresponding selectable element by a user of the user terminal.

In some embodiments, each said data object comprises a file.

In some embodiments, at least one of the characteristics of data objects comprises a file type.

In accordance with some arrangements there is provided a computer program product comprising a non-transitory computer-readable storage medium having computer readable instructions stored thereon, the computer readable instructions being executable by a computerized device to cause the computerized device to perform a method of selecting an application for processing of a data object on a user terminal, the method comprising: determining two or more data objects for selection by a user, said two or more data objects including a first data object having first data object characteristics and a second data object having second data object characteristics, the second data object characteristics being different from the first data object characteristics; identifying, based on the data object characteristics of the determined two or more data objects, two or more of a plurality of applications configured for use by the user terminal, each of the identified two or more applications being configured to process at least one of the two or more data objects, the identified two or more applications including at least one application configured to process data objects having the first data object characteristics and at least one application configured to process data objects having the second data object characteristics; and displaying, on a display of the user terminal, a plurality of selectable elements for selection by a user of the user terminal, including selectable elements corresponding to the two or more data objects and selectable elements corresponding to the identified two or more applications.

In accordance with some arrangements there is provided a user terminal comprising a processor, the user terminal being configured to: determine two or more data objects for selection by a user, said two or more data objects including a first data object having first data object characteristics and a second data object having second data object characteristics, the second data object characteristics being different from the first data object characteristics; identify, based on the data object characteristics of the determined two or more data objects, two or more of a plurality of applications configured for use by the user terminal, each of the identified two or more applications being configured to process at least one of the two or more data objects, the identified two or more applications including at least one application configured to process data objects having the first data object characteristics and at least one application configured to process data objects having the second data object characteristics; and display, on a display of the user terminal, a plurality of selectable elements for selection by a user of the user terminal, including selectable elements corresponding to the two or more data objects and selectable elements corresponding to the identified two or more applications.

In some embodiments, the user terminal maintains, on a data store, first data entries relating to said plurality of applications configured for use by the user terminal, and second data entries relating to one or more characteristics of data objects that each said application is capable of processing, each of the second data entries corresponding to one or more of the first data entries.

In some embodiments, the user terminal comprises said data store.

In accordance with some arrangements there is provided a method of selecting an application for execution on a user terminal, the method comprising: maintaining, on a data store:

data entries relating to a plurality of applications configured for use by the user terminal, and, for each of the plurality of applications: corresponding data entries relating to one or more predetermined characteristics of data objects with which the application has a first type of relationship; and corresponding data entries relating to one or more predetermined characteristics of data objects with which the application has a second type of relationship, different from the first type of relationship; determining one or more data objects for selection by a user, including at least a given data object; identifying, based on the data entries and the one or more determined data objects, at least a first application and a second application, the first application having the first type of relationship with the given data object and the second application having the second type of relationship with the given data object; and displaying, on a display of the user terminal, two or more selectable elements corresponding to the identified applications, including at least a first selectable element corresponding to the first application and a second selectable element corresponding to the second application; in response to a user selection of the first selectable element, performing a first type of processing action; and in response to user selection of the second selectable element, performing a second type of processing action, different from the first type of processing action, wherein the first type of processing action comprises initiating processing of the given data object using the first application and the second type of processing action comprises triggering execution of the second application for processing of data different from the given data object.

In some embodiments, the method comprises displaying, on the display of the user terminal, one or more further selectable elements corresponding to at least one of the identified data objects, including at least a third selectable element corresponding to the given data object.

In some embodiments, the first type of processing action is performed in response to user selection of the third selectable element.

In some embodiments, the user selection of the first selectable element and the second selectable element comprises a drag and drop operation performed on said user terminal.

In some embodiments, the method comprises modifying the displayed two or more selectable elements corresponding to the at least two identified applications in response to receiving user input identifying selection of the given data object.

In some embodiments, the modification comprises providing a visual indication on the display of the user terminal that at least one of the identified one or more applications is not capable of processing the given data object.

In some embodiments, the visual indication comprises masking the one or more selectable elements corresponding to the at least one application having the second type of relationship with the given data object.

In some embodiments, the locations on the display of the user terminal of the selectable elements that correspond to the at least one application having the first type of relationship with the given data object stay substantially the same after said modification.

In some embodiments, the modification comprises replacing at least one selectable element corresponding to an application having the second type of relationship with the given data object, with at least one selectable element corresponding to at least one further application having the first type of relationship with the given data object.

In some embodiments, the one or more predetermined characteristics of data objects comprise a data object type.

In some embodiments, the one or more predetermined characteristics of data objects comprise the presence of data of a given type within the associated data object.

In some embodiments, the one or more predetermined characteristics of data objects comprise at least one object attribute.

In some embodiments, the at least one object attribute comprises one or more of: an object size, an object dimension, an object duration, and an object age.

In some embodiments, each said data entry is generated during a registration process of the corresponding application.

In some embodiments, the method comprises maintaining, on the data store, further corresponding entries data entries relating to one or more services that may be executed by said plurality of applications in respect of data objects having one or more predetermined characteristics.

In some embodiments, the first type of processing action comprises, prior to triggering processing of the given data object using the first application: identifying, based on the data entries and selection of the given data object and the first application, one or more services that the first application is configured to execute in respect of the given data object; and displaying, on a display of the user terminal, one or more selectable elements corresponding to at least one of the identified one or more services, the one or more selectable elements being for selection by a user of the user terminal.

In some embodiments, the first type of processing action further comprises, prior to triggering processing of the given data object using the first application, receiving user input identifying selection of a given service, and wherein the processing of the given data object by the given application is initiated according to the given service.

In some embodiments, the given application is launched in response to receipt of the user input identifying selection of the given service.

In some embodiments, one or more of said plurality of applications are configured to execute services on the user terminal.

In some embodiments, one or more of said plurality of applications are configured to execute services remotely to the user terminal.

In some embodiments, initiating processing of the given data object using the first application comprises the first application sending a processing initiation message to a remote processing entity.

In some embodiments, said processing initiation message comprises the given data object.

In some embodiments, said processing initiation message comprises one or more processing parameters.

In some embodiments, determining the one or more data objects for selection by the user comprises receiving a list of data object identifiers from an initiating application on the user terminal, the list of data object identifiers comprising identifiers for at least the two or more data objects.

In some embodiments, at least one of the one or more data objects is generated in response to selection of the corresponding selectable element by a user of the user terminal.

In some embodiments, each said data object comprises a file.

In some embodiments, at least one of the characteristics of data objects comprises a file type.

In accordance with some arrangements there is provided a computer program product comprising a non-transitory computer-readable storage medium having computer readable instructions stored thereon, the computer readable instructions being executable by a computerized device to cause the computerized device to perform a method of selecting an application for execution on a user terminal, the method comprising: maintaining, on a data store: data entries relating to a plurality of applications configured for use by the user terminal, and, for each of the plurality of applications: corresponding data entries relating to one or more predetermined characteristics of data objects with which the application has a first type of relationship; and corresponding data entries relating to one or more predetermined characteristics of data objects with which the application has a second type of relationship, different from the first type of relationship; determining one or more data objects for selection by a user, including at least a given data object; identifying, based on the data entries and the one or more determined data objects, at least a first application and a second application, the first application having the first type of relationship with the given data object and the second application having the second type of relationship with the given data object; and displaying, on a display of the user terminal, two or more selectable elements corresponding to the identified applications, including at least a first selectable element corresponding to the first application and a second selectable element corresponding to the second application; in response to a user selection of the first selectable element, performing a first type of processing action; and in response to user selection of the second selectable element, performing a second type of processing action, different from the first type of processing action, wherein the first type of processing action comprises initiating processing of the given data object using the first application and the second type of processing action comprises triggering execution of the second application for processing of data different from the given data object.

In accordance with some arrangements there is provided a user terminal comprising a processor, the user terminal being configured to: maintain, on a data store: data entries relating to a plurality of applications configured for use by the user terminal, and, for each of the plurality of applications: corresponding data entries relating to one or more predetermined characteristics of data objects with which the application has a first type of relationship; and corresponding data entries relating to one or more predetermined characteristics of data objects with which the application has a second type of relationship, different from the first type of relationship; determine one or more data objects for selection by a user, including at least a given data object; identify, based on the data entries and the one or more determined data objects, at least a first application and a second application, the first application having the first type of relationship with the given data object and the second application having the second type of relationship with the given data object; and display, on a display of the user terminal, two or more selectable elements corresponding to the identified applications, including at least a first selectable element corresponding to the first application and a second selectable element corresponding to the second application; perform, in response to a user selection of the first selectable element, a first type of processing action; and perform, in response to user selection of the second selectable element, a second type of processing action, different from the first type of processing action, wherein the first type of processing action comprises initiating processing of the given data object using the first application and the second type of processing action comprises triggering execution of the second application for processing of data different from the given data object.

In some embodiments, the user terminal comprises said data store.

The above embodiments are to be understood as illustrative examples of the invention. Further embodiments of the invention are envisaged. For example, while the embodiments described above are detailed in relation to drag and drop style user input, the invention is compatible with alternative input methods, including point and click or keyboard based interactions. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of selecting a service for processing of a data object on a user terminal, the user terminal comprising a processor, the method comprising:

receiving, by the user terminal, from each of a plurality of different applications, an indication of one or more services that the respective application is configured to perform;

receiving, by the user terminal, from each of the plurality of applications, an indication of one or more characteristics of data objects, wherein each of the data objects is associated with a respective service that is configured to be performed by the respective application, and the one or more characteristics of a respective data object comprise one or more of: an object size, an object dimension, an object duration, and an object age;

maintaining, by the user terminal, in a data store:

first data entries relating to the one or more services that are executed by one or more applications configured for use by the user terminal;

second data entries relating to the one or more predetermined characteristics of data objects in respect of the corresponding ones of the one or more services are performed;

action data entries defining one or more processing actions for performance on selection of a service of the one or more services in respect of the data objects having characteristics as defined by the second data entries; and outcome data entries defining how the method is to proceed after performance of the one or more processing actions indicated by respective action data entries; determining, by the user terminal, one or more data objects for selection by a user;

identifying, by the user terminal and based on the determined one or more data objects and on the first and second data entries, one or more services that are performed in relation to at least one of the one or more data objects; and displaying, on a display of the user terminal, one or more first selectable elements corresponding to at least one of the identified one or more services, and one or more second selectable elements corresponding to at least one of the determined one or more data objects, each of the first and second selectable elements being for selection by a user of the user terminal.

2. A method according to claim 1, wherein the data store comprises third data entries relating to the one or more applications configured for use by the user terminal, the method comprising:

identifying, based on the determined one or more data objects and on the first, second, and third data entries, one or more applications that are configured to process at least one of the determined one or more data objects; and displaying, on the display of the user terminal, one or more third selectable elements corresponding to at least one of the identified one or more applications for selection by a user of the user terminal.

3. A method according to claim 2, further comprising receiving user input identifying selection of a given application of the identified one or more applications, wherein the one or more first selectable elements are displayed in response to the received user input identifying selection of the given application, each of the displayed first selectable element corresponding to a service that is executed by the given application.

4. A method according to claim 2, further comprising:

receiving user input identifying selection of a given data object of the determined one or more data objects;

receiving user input identifying selection of a given service of the identified one or more services;

identifying, based on the first, second, and third data entries and the received user input identifying selection of the given service, a given application of the one or more applications, the given application being configured to perform the given service; and initiating performance of the given service in relation to the given data object by the given application.

5. A method according to claim 4, wherein the given application is launched in response to receipt of the user input identifying selection of the given service.

6. A method according to claim 4, wherein the user input identifying selection of the given data object and the given service comprises a drag and drop operation performed on the user terminal.

7. A method according to claim 1, wherein the method comprises:

receiving user input identifying selection of a given data object of the determined one or more data objects;

receiving user input identifying selection of a given service of the identified one or more services;

identifying one or more of the one or more processing actions based on the action data entries and one or more of the received user input identifying selection of a given data object and the received user input identifying selection of a given service; and performing the identified the one or more of the one or more processing actions.

8. A method according to claim 7, wherein the selected processing action comprises displaying on the display of the user terminal, one or more fourth selectable elements corresponding to one or more further data objects.

9. A method according to claim 8, wherein the outcome data entries comprises one or more further processing actions for performance on selection of a further data object of the one or more further data objects, and the method comprises:

receiving user input identifying selection of a further data object of the one or more further data objects; and identifying a further processing action of the one or more further processing actions on a basis of the outcome data entries and the received user input identifying selection of a given service.

10. A method according to claim 9, further comprising performing an identified further processing action of the one or more processing actions in response to the identification of the identified further processing action, the identified processing action being performed at least partly on a basis of one or more characteristics of the selected further data object.

11. A method according to claim 10, wherein the identified processing action comprises populating the selected further data object with data from the given data object.

12. A method according to claim 9, further comprising:
displaying one or more selectable elements corresponding to the identified further processing action;
receiving a user input for selection of the identified further processing action; and
performing the identified further processing action, the further processing action being performed at least partly on a basis of one or more characteristics of the further data object.

13. A method according to claim 1, wherein the one or more predetermined characteristics of data objects further comprise a data object type.

14. A method according to claim 1, wherein the one or more predetermined characteristics of data objects further comprise a presence of data of a given type within an associated data object.

15. A method according to claim 1, wherein the one or more predetermined characteristics of data objects further comprise at least one object attribute.

16. A method according to claim 1, wherein each of the first and second data entries is generated during a registration process of a corresponding application.

17. A method according to claim 1, wherein one or more of the one or more services are configured to be executed on the user terminal.

18. A method according to claim 1, wherein one or more of the one or more services are configured to be executed remotely to the user terminal.

19. A method according to claim 18, wherein initiating performance of a given data object by a given application comprises the given application sending a processing initiation message to a remote processing entity.

20. A method according to claim 19, wherein the processing initiation message comprises the given data object.

21. A method according to claim 19, wherein the processing initiation message comprises one or more processing parameters.

22. A method according to claim 1, wherein determining the one or more data objects for selection by the user comprises receiving a list of data object identifiers from an initiating application on the user terminal, the list of data object identifiers comprising identifiers for at least the one or more data objects.

23. A method according to claim 22, wherein at least one of the one or more data objects is generated in response to selection of the corresponding selectable element by a user of the user terminal.

24. A method according to claim 1, wherein each of the data object comprises a file.

25. A method according to claim 24, wherein at least one of the one or more predetermined characteristics of data objects comprises a file type.

26. A computer program product comprising a non-transitory computer-readable storage medium having computer readable instructions stored thereon, the computer readable instructions being executable by a user terminal to cause the user terminal to perform a method of selecting a service for processing of a data object on the user terminal, the user terminal comprising a processor, the method comprising:
receiving from each of a plurality of different applications, an indication of one or more services that the respective application is configured to perform;
receiving from each of the plurality of applications, an indication of one or more characteristics of data objects, wherein each of the data objects is associated with a respective service that is configured to be performed by the respective application, and the one or more characteristics of a respective data object comprise one or more of: an object size, an object dimension, an object duration, and an object age;
maintaining in a data store:
first data entries relating to the one or more services that are executed by one or more applications;
second data entries relating to the one or more predetermined characteristics of data objects in respect of the corresponding ones of the one or more services are performed;
action data entries defining one or more processing actions for performance on selection of a service of the one or more services in respect of the data objects having characteristics as defined by the second data entries; and
outcome data entries defining how the method is to proceed after performance of the one or more processing actions indicated by respective action data entries;
determining one or more data objects for selection by a user;
identifying, based on the determined one or more data objects and on the first and second data entries, one or more services that are performed in relation to at least one of the one or more data objects; and
displaying, on a display of the user terminal, one or more first selectable elements corresponding to at least one of the identified one or more services, and one or more second selectable elements corresponding to at least one of the determined one or more data objects, each of the first and second selectable elements being for selection by a user of the user terminal.

27. A user terminal comprising a processor, the user terminal being configured to:
receive from each of a plurality of different applications, an indication of one or more services that the respective application is configured to perform;
receive from each of the plurality of applications, an indication of one or more characteristics of data objects, wherein each of the data objects is associated with a respective service that is configured to be performed by the respective application, and the one or more characteristics of a respective data object comprise one or more of: an object size, an object dimension, an object duration, and an object age;
maintain, in a data store:
first data entries relating to the one or more services that are executed by one or more applications;
second data entries relating to the one or more predetermined characteristics of data objects in respect of the corresponding ones of the one or more services are performed;
action data entries defining one or more processing actions for performance on selection of a service of the one or more services in respect of the data objects having characteristics as defined by the second data entries; and
outcome data entries defining how the user terminal is to proceed after performance of the one or more processing actions indicated by respective action data entries;

determine one or more data objects for selection by a user;

identify, based on the determined one or more data objects and on the first and second data entries, one or more services that are performed in relation to at least one of the one or more data objects; and display, on a display of the user terminal, one or more first selectable elements corresponding to at least one of the identified one or more services, and one or more second selectable elements corresponding to at least one of the determined one or more data objects, each of the first and second selectable elements being for selection by a user of the user terminal.

28. A user terminal according to claim 27, further comprising the data store.

* * * * *